US012266361B2

(12) United States Patent
Wang et al.

(10) Patent No.: US 12,266,361 B2
(45) Date of Patent: Apr. 1, 2025

(54) SYSTEMS AND METHODS FOR CORRELATING SPEECH AND LIP MOVEMENT

(71) Applicant: Netflix, Inc., Los Gatos, CA (US)

(72) Inventors: Yadong Wang, Campbell, CA (US); Shilpa Jois Rao, Cupertino, CA (US)

(73) Assignee: Netflix, Inc., Los Gatos, CA (US)

( * ) Notice: Subject to any disclaimer, the term of this patent is extended or adjusted under 35 U.S.C. 154(b) by 824 days.

(21) Appl. No.: 16/911,247

(22) Filed: Jun. 24, 2020

(65) Prior Publication Data

US 2021/0407510 A1    Dec. 30, 2021

(51) Int. Cl.
G10L 15/25     (2013.01)
G10L 25/78     (2013.01)

(52) U.S. Cl.
CPC .............. G10L 15/25 (2013.01); G10L 25/78 (2013.01)

(58) Field of Classification Search
CPC ....... G10L 15/25; G10L 25/78; G11B 27/031; G11B 27/10
See application file for complete search history.

(56) References Cited

U.S. PATENT DOCUMENTS

| | | | | |
|---|---|---|---|---|
| 3,743,391 A | * | 7/1973 | White | G11B 27/10 |
| 2004/0267521 A1 | * | 12/2004 | Cutler | G10L 25/78 |
| | | | | 704/E11.003 |
| 2011/0208520 A1 | * | 8/2011 | Lee | G10L 25/78 |
| | | | | 704/E15.039 |

FOREIGN PATENT DOCUMENTS

| | | |
|---|---|---|
| AU | 2021297802 A1 | 3/2022 |
| CA | 3146707 A1 | 12/2021 |
| EP | 4022608 A1 | 7/2022 |
| JP | 2008310382 A * | 12/2008 |
| WO | 2020/081872 A1 | 4/2020 |
| WO | WO2020081872 A * | 4/2020 |
| WO | 2021262737 A1 | 12/2021 |

OTHER PUBLICATIONS

Sehgal et al., "A Convolutional Neural Network Smartphone App for Real-Time Voice Activity Detection", IEEE Access, vol. 6, Feb. 1, 2018, pp. 9017-9026.

(Continued)

*Primary Examiner* — Angela A Armstrong
(74) *Attorney, Agent, or Firm* — Greenberg Traurig, LLP

(57) ABSTRACT

The disclosed computer-implemented method includes analyzing, by a speech detection system, a media file to detect lip movement of a speaker who is visually rendered in media content of the media file. The method additionally includes identifying, by the speech detection system, audio content within the media file, and improving accuracy of a temporal correlation of the speech detection system. The method may involve correlating the lip movement of the speaker with the audio content, and determining, based on the correlation between the lip movement of the speaker and the audio content, that the audio content comprises speech from the speaker. The method may further involve recording, based on the determination that the audio content comprises speech from the speaker, the temporal correlation between the speech and the lip movement of the speaker as metadata of the media file. Various other methods, systems, and computer-readable media are disclosed.

20 Claims, 16 Drawing Sheets

(56) References Cited

OTHER PUBLICATIONS

International Search Report and Written Opinion received for PCT Application Serial No. PCT/US2021/038515 dated Oct. 18, 2021, 12 pages.
Tsekeridou, Sofia, "Content-Based Video Parsing and Indexing Based on Audio-Visual Interaction", IEEE Transactions on Circuits and Systems for Video Technology, Apr. 2001, vol. 11, No. 4, pp. 522-535.
Examination report issued Dec. 12, 2022 in corresponding Australian foreign application No. 2021297802.
Communication pursuant to Article 94(3) EPC received for EP Application No. 21745500.5, mailed on Nov. 23, 2023.

* cited by examiner

SYSTEMS AND METHODS FOR CORRELATING SPEECH AND LIP MOVEMENT

BACKGROUND

Media content produced in one language is often provided with subtitles (subs) or dubs for distribution in other languages. Dubs are audio tracks that are designed to replace or augment the original audio experience with a local version. The most common version of dubs used today is "lip sync," where the dialog is translated, performed, and mixed as a drop-in replacement for the original dialog audio.

A successful dub may need to delicately balance synchrony across characters and voice talent to create a final product that transparently fits the original content. An effective dub may need to be visually transparent while conveying the original emotion and message of the content. Advancements in certain types of technology, such as the ability to re-animate characters for different languages, means that synchrony has the potential to create a truly transparent final product that is no longer consumed as a globalized asset but instead feels like the title was originally produced in a given language.

For the transcribers, translators, directors, and others involved in the dubbing process, difficulty can arise in observing and accurately appreciating when a speaker's lips are in view on screen and moving in such a manner that the timing and tempo of the recording are most important, especially since the dubbing process often involves working with low-resolution video content.

SUMMARY

As will be described in greater detail below, the present disclosure describes a system and method for correlating speech and lip movement.

In one example, a computer-implemented method includes analyzing, by a speech detection system, a media file to detect lip movement of a speaker who is visually rendered in media content of the media file. The method additionally includes identifying, by the speech detection system, audio content within the media file, and improving accuracy of a temporal correlation of the speech detection system. The accuracy is improved by correlating the lip movement of the speaker with the audio content, and determining, based on the correlation between the lip movement of the speaker and the audio content, that the audio content comprises speech from the speaker. The accuracy is further improved by recording, based on the determination that the audio content comprises speech from the speaker, the temporal correlation between the speech and the lip movement of the speaker as metadata of the media file.

In some implementations of the method, analyzing the media file to detect lip movement of the speaker includes identifying one or more segments of the media file in which lips of the speaker are open based on a ratio of mouth height to mouth width. The analyzing also includes determining a standard variance of the one or more segments by measuring an average spread of ratio values of a segment from a mean of the ratio values of the segment. The analyzing further includes detecting lip movement in the one or more segments for which the standard variance exceeds a threshold.

In some implementations of the method, identifying the audio content includes calculating energy values of the audio content of the one or more segments. Additionally, some of these implementations of the method include correlating the lip movement of the speaker with the audio content at least in part by determining a cross-correlation between the lip movement and energy values for the segment. The cross-correlation is performed by measuring similarity of a summed sequence of the ratio values of the segment as a function of displacement of that summed sequence with respect to another summed sequence of the energy values for the segment. In some of these implementations of the method, determining that the audio content comprises speech from the speaker includes determining one or more segments of the media file at which the cross-correlation exceeds a threshold.

In alternative or additional implementations of the method, identifying the audio content includes performing voice activity detection (VAD) of the media file using a VAD algorithm that employs a classifier to make predictions of speech and non-speech for one or more individual audio frames. In some of these implementations of the method, correlating the lip movement of the speaker with the audio content includes identifying one or more segments of the media file at which both lip movement and voice activity are detected. In some of these implementations of the method, determining that the audio content comprises speech from the speaker includes determining that the one or more segments of the media file comprise speech from the speaker in response to the identifying the one or more segments of the media file at which both lip movement and voice activity are detected.

Additional or alternative implementations of the method further include providing the metadata to a playback system that causes the playback system to, during playback of the media file, signal the temporal correlation between the speech and the lip movement of the speaker.

In addition, a corresponding speech detection system includes at least one physical processor, and a physical memory comprising computer-executable instructions that, when executed by the physical processor, cause the physical processor to carry out various operations. For example, the instructions cause the physical processor to analyze a media file to detect lip movement of a speaker who is visually rendered in media content of the media file and to identify audio content within the media file. Additionally, the instructions cause the physical processor to improve accuracy of a temporal correlation of the speech detection system by correlating the lip movement of the speaker with the audio content, and determining, based on the correlation between the lip movement of the speaker and the audio content, that the audio content comprises speech from the speaker. Also, the accuracy is improved by recording, based on the determination that the audio content comprises speech from the speaker, the temporal correlation between the speech and the lip movement of the speaker as metadata of the media file.

In some implementations of the system, the instructions that cause the physical processor to identify the audio content include instructions that cause the physical processor to calculate energy values of the audio content of one or more segments. Additionally, the instructions that cause the physical processor to correlate the lip movement of the speaker with the audio content include instructions that cause the physical processor to determine a cross-correlation between the lip movement and energy values for a segment. The cross-correlation is performed by measuring similarity of a summed sequence of the ratio values of the segment as a function of displacement of that summed sequence with respect to another summed sequence of the energy values for the segment. Also, the instructions that cause the physical processor to determine that the audio content comprises speech from the speaker include instructions that cause the physical processor to determine one or more segments of the media file at which the cross-correlation exceeds a threshold.

In additional or alternative implementations of the system, the instructions that cause the physical processor to analyze the media file to detect lip movement of the speaker include instructions that cause the physical processor to identify one or more segments of the media file in which lips of the speaker are open based on the ratio values that reflect a ratio of mouth height to mouth width. The instructions that cause the physical processor to analyze the media file to detect lip movement of the speaker additionally include instructions that cause the physical processor to determine a standard variance of the one or more segments by measuring an average spread of ratio values of a segment from a mean of the ratio values of the segment. The instructions that cause the physical processor to analyze the media file to detect lip movement of the speaker also include instructions that cause the physical processor to detect lip movement in the one or more segments for which the standard variance exceeds a threshold.

In additional or alternative implementations of the system, the instructions that cause the physical processor to identify the audio content include instructions that cause the physical processor to perform voice activity detection (VAD) of the media file using a VAD algorithm that employs a classifier to make predictions of speech and non-speech for one or more individual audio frames. In some of these implementations of the system, the instructions that cause the physical processor to determine that the audio content comprises speech from the speaker include instructions that cause the physical processor to determine that one or more segments of the media file comprise speech from the speaker in response to identifying the one or more segments of the media file at which both lip movement and voice activity are detected.

Additional or alternative implementations of the system further include instructions that cause the physical processor to provide the metadata to a playback system that causes the playback system to, during playback of the media file, signal the temporal correlation between the speech and the lip movement of the speaker.

In some examples, the above-described method may be encoded as computer-readable instructions on a computer-readable medium. For example, a computer-readable medium may include one or more computer-executable instructions that, when executed by at least one processor of a computing device, may cause the computing device to analyze, by a speech detection system, a media file to detect lip movement of a speaker who is visually rendered in media content of the media file. The instructions additionally cause the computing device to identify, by the speech detection system, audio content within the media file and improve accuracy of a temporal correlation of the speech detection system. For example, the accuracy is improved by correlating the lip movement of the speaker with the audio content and determining, based on the correlation between the lip movement of the speaker and the audio content, that the audio content comprises speech from the speaker. The accuracy is additionally improved by recording, based on the determination that the audio content comprises speech from the speaker, the temporal correlation between the speech and the lip movement of the speaker as metadata of the media file.

In some implementations of the non-transitory computer-readable medium, the instructions that cause the computing device to identify the audio content include instructions that cause the computing device to calculate energy values of the audio content of one or more segments. Additionally, the instructions that cause the computing device to correlate the lip movement of the speaker with the audio content include instructions that cause the computing device to determine a cross-correlation between the lip movement and energy values for a segment. The cross-correlation is performed by measuring similarity of a summed sequence of the ratio values of the segment as a function of displacement of that summed sequence with respect to another summed sequence of the energy values for the segment.

In additional or alternative implementations of the non-transitory computer-readable medium, the instructions that cause the computing device to identify the audio content include the instructions that cause the computing device to perform voice activity detection (VAD) of the media file using a VAD algorithm that employs a classifier to make predictions of speech and non-speech for one or more individual audio frames. Additionally, the instructions that cause the computing device to determine that the audio content comprises speech from the speaker include instructions that cause the computing device to determine that one or more segments of the media file comprise speech from the speaker in response to the identifying the one or more segments of the media file at which both lip movement and voice activity are detected.

Additional or alternative implementations of the non-transitory computer-readable medium include instructions that cause the computing device to provide the metadata to a playback system that causes the playback system to, during playback of the media file, signal the temporal correlation between the speech and the lip movement of the speaker. In some of these implementations, the indicators correspond to visual indicators and/or auditory indicators.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 4 is a block diagram illustrating detection of face landmarks in accordance with the present disclosure.

FIG. 13 is a diagram of a graphical user interface that signals whether speakers' lips are open or closed.

Figure 1:
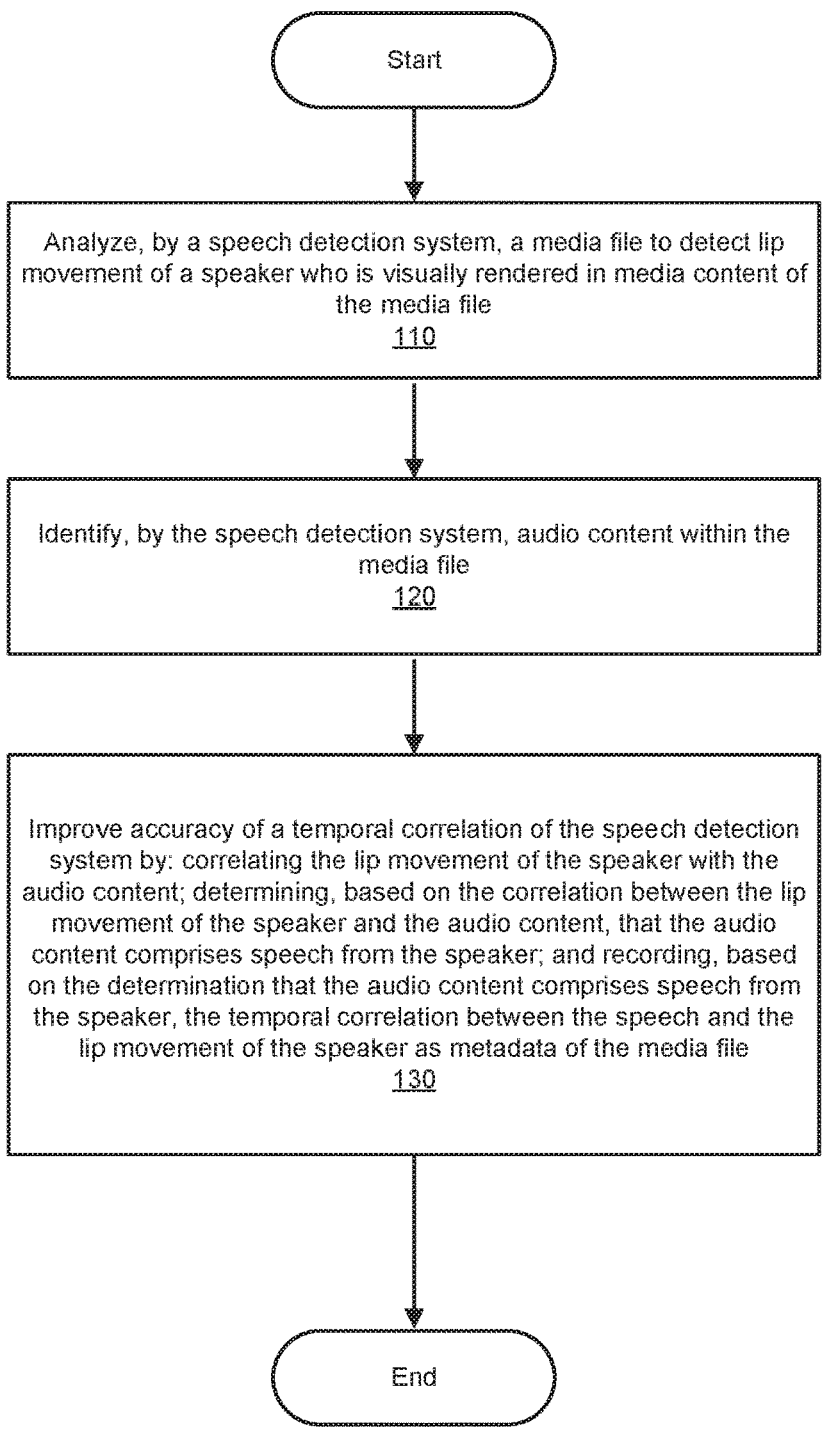
FIG. 1 is a flow diagram of an exemplary method for correlating speech and lip movement in accordance with the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to correlating speech and lip movement. In particular, the speech detection systems and methods disclosed herein record a temporal correlation between speech and lip movement of a speaker visually rendered in media content of a media file. As will be explained in greater detail below, embodiments of the present disclosure may improve accuracy of a temporal correlation of the speech detection system by (1) correlating the lip movement of the speaker with audio content within the media file and (2) determining, based on the correlation between the lip movement of the speaker and the audio content, that the audio content contains speech from the speaker. Based on the determination that the audio content contains speech from the speaker, some embodiments may record the temporal correlation between the speech and the lip movement of the speaker as metadata of the media file.

The disclosed systems and methods provide one or more features and advantages over traditional dubbing processes. A typical dubbing process involves generation of a transcript of all speech in a media file (e.g., by creating a dubbing stem script). Such a script may be analyzed frame-by-frame, with every pause in the dialogue, taking into account tonal inflections and general tenor to ensure the nuance of the performance is transmitted to the translators. The resulting master script is sent to a target-language team, often with music and effects tracks and a low-resolution version of the video to prevent unauthorized redistribution. The language team then translates and adapts the dubbing script by matching the length of each line of dialogue to the original script. Sometimes, software tools are used to count each syllable of the script in the original language so that the translated script can be better adapted to the timing and tempo of the original language recording. Quality control editors work with the dialogue in the target language to ensure the lip-syncing to the video is accurate and well timed. In some instances, selective technical adjustments are made to imperceptibly slow down or speed up the video in order to improve the lip-sync of the dub.

Following the thorough preparation of the script, the voice talent and directors produce the recorded voices in a recording studio. Directors work closely with translators and they guide the actors to tonal, intonation, and linguistic accuracy and expressiveness. Dynamic interfaces may be used that implement a karaoke style of direction to guide the actors. Finally, sound engineers create a mix that incorporates the music and effects tracks and is "laid back" to the original video. Sometimes, replacement of the voice audio may remove sound effects or other elements that the sound engineer may add back during this process.

One significant objective of dubbing may be to create visual-optical synchrony, which includes various elements. For example, one type of visual synchrony corresponds to lip synchrony/phonetic synchrony. Additionally, another type of visual synchrony corresponds to syllable articulation synchrony. Also, another type of visual synchrony corresponds to length of utterance synchrony, which is also referred to as gap synchrony or isochrony. A further type of visual synchrony corresponds to gesture and facial expression synchrony, which is also referred to as kinetic synchrony. As will be appreciated, the systems and methods disclosed herein may improve one or more of any of these types of synchrony. Embodiments of this disclosure may also provide various other advantages over traditional dubbing systems.

As noted above, difficulty can arise in observing and accurately appreciating when a speaker's lips are in view on screen and moving in such a manner that the timing and tempo of the recording are most important. It would be beneficial for those involved in the dubbing process to be able to more easily and accurately determine the critical sections of dialogue that need to be matched to the on-screen lip movement of a speaker.

The systems and methods disclosed herein provide advantages over traditional dubbing systems in numerous ways. For example, the systems and methods described herein may assist persons involved in a dubbing process by configuring a media file to signal correlation between speech and lip movement during playback of the media file. This information may be helpful in guiding a translator to those portions of the original dialogue that strongly correlate with lip movement displayed onscreen. Accordingly, the translator may focus on the cadence and timing of these portions during the translation process and make selections of dialogue translations that assist a director in matching the cadence and timing of the translated dialogue to the on screen lip movement. The translator is also enabled to more easily recognize when original dialogue does not strongly correlate to displayed lip movement and thus translate those portions of the dialogue more freely and efficiently. Thus, the translation process may be rendered more efficient without diminishing the quality of the cadence and timing synchrony aspect of the translation. Similarly, directors may more efficiently and accurately direct voice actors, and the metadata may also be fed into a karaoke style direction system to aid in generating timing and cadence of prompts displayed to voice actors.

The following will provide, with reference to FIGS. 1-13, detailed descriptions of systems and methods for correlating speech and lip movement. A computer-implemented method for correlating speech and lip movement is described with reference to FIG. 1, and a corresponding speech detection system that implements the computer-implemented method is described with reference to FIG. 2. An implementation in which the correlation is made based on a cross-correlation of audio energy with lip movement is described with reference to FIGS. 3-5. Another implementation in which the correlation is made based on detection of voice activity in audio frames corresponding to video segments exhibiting lip movement is described with reference to FIGS. 6-10. A further implementation combining the audio energy cross-correlation and voice activity detection is described with reference to FIG. 11. An example of signaling of the correlation during video playback is described with reference to FIGS. 12A and 12B, and an example user interface for displaying lips-on-off indicators is provided with reference to FIG. 13.

Because many of the embodiments described herein may be used with substantially any type of computing network, including distributed networks designed to provide video content to a worldwide audience, various computer network and video distribution systems will be described with reference to FIGS. 14-16. These figures will introduce the various networks and distribution methods used to provision video content to users.

Speech may be correlated with lip movement in any suitable manner, and FIG. 1 is a flow diagram of an exemplary computer-implemented method 100 for correlating speech with lip movement. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

Beginning at step 110, the computer-implemented method of FIG. 1 includes analyzing, by a speech detection system, a media file to detect lip movement of a speaker who is visually rendered in media content of the media file. The media file may be analyzed by any suitable systems and/or modules. For example, analysis module 204 in speech detection system 200 may analyze a media file to detect lip movement of a speaker.

Analysis module 204 may analyze a media file in any suitable manner. In some implementations of method 100, analysis module 204 may analyze the media file by identifying one or more segments of the media file in which lips of the speaker are open by calculating a ratio of mouth height to mouth width, as detailed later with reference to FIG. 4. In such implementations, analysis module 204 may determine a standard variance of the one or more segments by measuring an average spread of ratio values of a segment from a mean of the ratio values of the segment. Further details regarding the determination of the standard variance are discussed later with reference to FIG. 5. Analysis module 204 may also detect lip movement in the one or more segments for which the standard variance exceeds a threshold, such as a heuristic threshold, as also detailed with reference to FIG. 5. In the example shown, processing proceeds from step 110 to step 120. However, it should be understood that step 110 and step 120 may be performed in parallel, or that step 120 may be performed before proceeding to step 110.

The term media file, in some embodiments, generally refers to any type or form of digital file that contains both audio and video content. A media file can be a multimedia file that contains both audio and video content (e.g., an MP4 file, an AVI file, an MOV file, a WMV file, etc.). Alternatively, a media file can be a container (e.g., a multi-media project file) having separate video and audio files within the container (e.g., an Abobe Premiere project file, a Final Cut project file, etc.). The video within the media file can be of any suitable resolution (e.g., 720p, 1080p, 1440p, 2K, 4K, etc.) and/or frame rate (e.g., 24 fps, 25 fps, 30 fps, 60 fps, 120 fps, etc.).

The term speaker, in some embodiments, generally refers to any source of spoken audio content in the media file. For example, a speaker may be a human actor, an animated character, or any other source of audio content that communicates with a mouth (e.g., that has lips) and that is visually rendered in the media file at least part of the time while speaking.

The term speaking, in some embodiments, generally refers to the action of conveying information or expressing thoughts and feelings in a spoken language. Speaking may occur in various forms and formats (e.g., talking, singing, chanting, etc.). Thus, speech may take any form capable of carrying out the expression of thoughts, feelings, ideas, etc. by articulating sounds.

The term visual rendering, in some embodiments, generally refers to the automatic process of generating a photorealistic or non-photorealistic image from a 2D or 3D model by a computer program. A speaker is visually rendered when an image or icon representing the speaker is rendered on screen, regardless of whether a set of lips of the speaker are visible. For example, lips of a speaker may be off screen (e.g., turned away from view) while an image of the speaker is visually rendered on screen. Alternatively, the lips of the visually rendered speaker may be on screen and detectable.

The term lip, in some embodiments, generally refers to either of the two parts that form the upper and lower edges of the opening of the mouth and/or that help a speaker articulate the sounds (e.g., vowels and consonants) that make up speech. The phrase "set of lips" generally refers to a pair of both of these parts of a mouth. Lips may move as a result of change in camera angle, head movement, speaking, eating, emotional reaction, or any other activity that causes a change in position of the lips on the screen. Embodiments of the present disclosure detect when lips are moving as a result of speaking as opposed to other activities that may result in lip movement.

At step 120, method 100 additionally includes identifying, by the speech detection system, audio content within the media file. The audio content may be identified by any suitable systems and/or modules. For example, identification module 206 in speech detection system 200 may identify audio content within media file 222.

The term audio content generally refers to any type of content or information that is consumed through listening. In some embodiments, audio content may refer to information encoded in an audio track synchronized with a video track of a multimedia file. Audio content may include speech, music, effects, and combinations thereof. In some instances, a dedicated dialogue track may contain speech of multiple speakers or a single speaker, but not music or audio. In other instances, an audio track may contain speech of one or more speakers and may also contain music and/or sound effects.

Identification module 206 may analyze a media file in any suitable manner. In some implementations of method 100, identification module 206 may identify the audio content by calculating energy values of the audio content of the one or more segments. The term energy values generally refers to a measured amplitude (i.e., intensity) of an audio signal encoded in an audio track of the media file, and the energy values may be measured in any suitable units (e.g., decibels (dB)). In alternative or additional implementations of the method, identification module 206 may identify the audio content by performing voice activity detection (VAD) of the media file using a VAD algorithm that employs a classifier to make predictions of speech and non-speech for one or more individual audio frames. Additional details of VAD algorithms are provided below with reference to FIGS. 6-10.

At step 130, method 100 includes several steps involved in improving accuracy of a temporal correlation of a speech detection system (i.e., a temporal correlation between lip movement and audio content). Accuracy of the temporal correlation between lip movement and audio content may be improved by any suitable systems and/or modules. For example, correlation module 208 in speech detection system 200 may improve accuracy of correlating lip movement to audio content.

The term temporal correlation, in some embodiments, generally refers to observable synchrony, during playback of a media file, between speech of a speaker and lip movement of the speaker. The temporal correlation may be improved by increasing the observability of the synchrony between the speech of the speaker and the lip movement of the speaker. For example, rather than requiring an observer to apprehend the temporal correlation solely by observing the lip movement of the speaker while listening to the speech of the speaker, an additional signal may be provided that more clearly and accurately indicates which portions of the speech strongly correlate with lip movement of the speaker. As described in greater detail later with reference to FIGS. 12A, 12B, and 13, such a signal may be visual and/or auditory in nature.

Correlation module 208 may improve accuracy of the temporal correlation in any suitable manner. In some embodiments, temporal correlation module 208 improves temporal correlation by attempting to identify the beginning and end of segments where lip movement correlates to speech. In other words, temporal correlation module 208 may improve the accuracy of temporal correlation at step 130 by first correlating the lip movement of a speaker with the audio content and then determining, based on the correlation between the lip movement of the speaker and the audio content, that the audio content includes speech from the speaker.

Temporal correlation module 208 may then, based on the determination that the audio content includes speech from the speaker, record the temporal correlation between the speech and the lip movement of the speaker as metadata of the media file. Alternatively, step 130 may further entail providing the metadata to a playback system that causes the playback system to, during playback of the media file, signal the temporal correlation between the speech and the lip movement of the speaker. Additional details of such signaling are provided below with reference to FIGS. 12A, 12B, and 13.

Correlation module 208 may correlate the lip movement of the speaker with the audio content in a variety of ways. In some embodiments, correlation module 208 may calculate a cross-correlation between the lip movement and energy values for the segment. Correlation module 208 may calculate the cross-correlation by measuring a similarity of a summed sequence of the ratio values of the segment as a function of displacement of that summed sequence with respect to another summed sequence of the energy values for the segment. In some of these implementations of method 100, correlation module 208 may determine that the audio content includes speech from the speaker by identifying one or more segments of the media file at which the cross-correlation exceeds a threshold.

In the implementations of method 100 that include performing VAD, correlation module 208 may correlate the lip movement of the speaker with the audio content at least in part by identifying one or more segments of the media file at which both lip movement and voice activity are detected. In some embodiments, correlation module 208 may determine that the audio content includes speech from the speaker at step 130 in response to identifying the one or more segments of the media file at which both lip movement and voice activity are detected.

Figure 2:
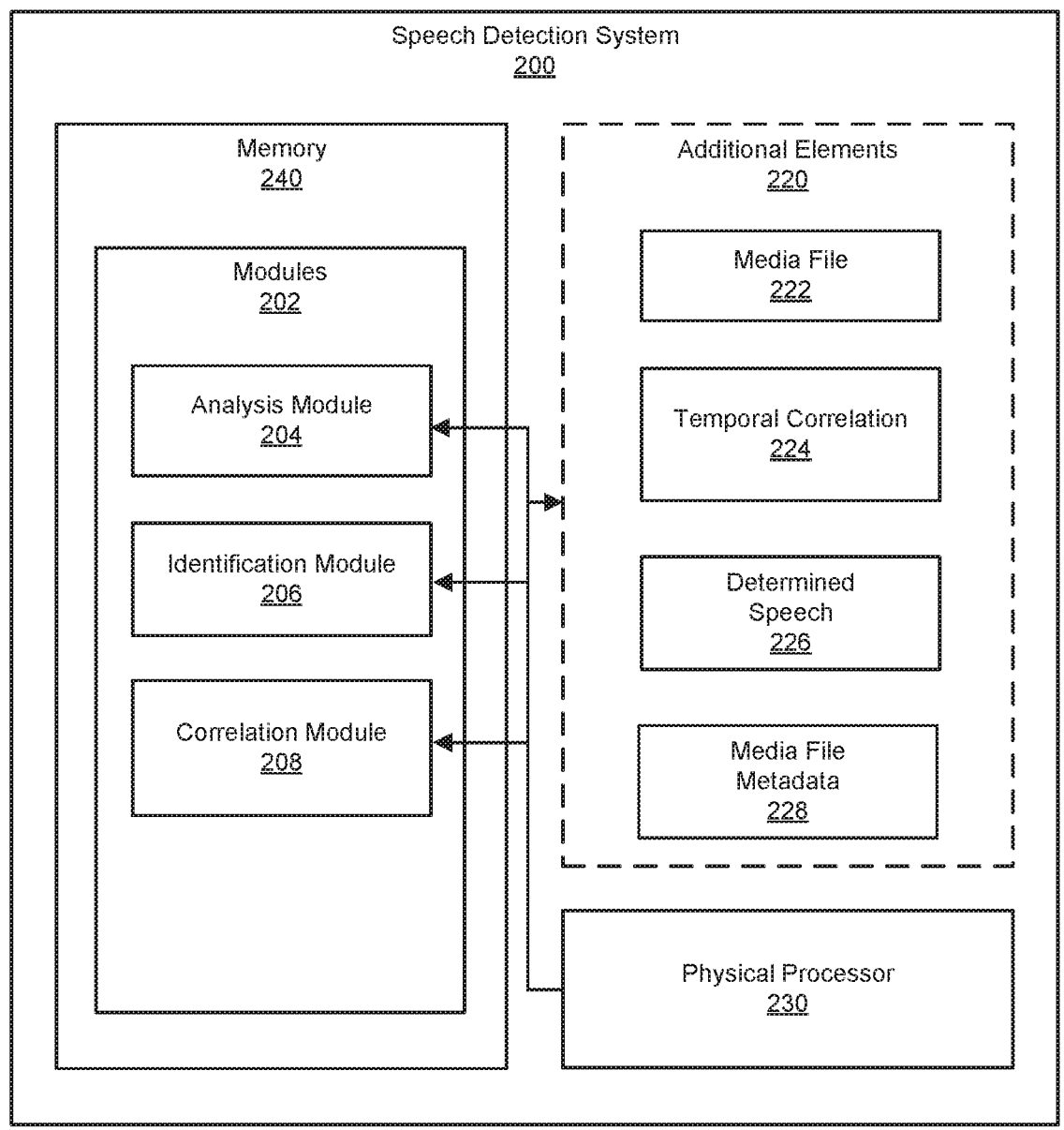
FIG. 2 is a block diagram of an exemplary speech detection system in accordance with the present disclosure.

A speech detection system may be implemented in any suitable manner. Turning to FIG. 2, an exemplary speech detection system 200 includes at least one physical processor 230, physical memory 240 comprising computer-executable instructions such as modules 202, and additional elements 220. When executed by the physical processor, the modules 202 cause physical processor 230 to carry out various operations. For example, analysis module 204 may execute procedures described above with reference to step 110 of method 100 of FIG. 1. Accordingly, analysis module 204 may cause physical processor 230 to analyze a media file 222 to detect lip movement of a speaker who is visually rendered in media content of media file 222. Additionally, identification module 206 may execute procedures described above with reference to step 120 of method 100 of FIG. 1. Accordingly, identification module 206 causes physical processor 230 to identify audio content within media file 222. Also, correlation module 208 may execute procedures described above with reference to step 120 of method 100 of FIG. 1. Accordingly, correlation module 208 causes physical processor 230 to improve accuracy of a temporal correlation 224 of speech detection system 200 by correlating the lip movement of the speaker with the audio content and determining, based on the correlation between the lip movement of the speaker and the audio content, that the audio content includes speech from the speaker.

Identification module 206 may also record, based on the determination 226 that the audio content comprises speech from the speaker, temporal correlation 224 between the speech and the lip movement of the speaker as metadata 228 of the media file. Metadata 228 may then be provided to a playback system that causes the playback system to, during playback of the media file, signal the temporal correlation between the speech and the lip movement of the speaker. This signaling may occur in any manner previously described with reference to FIG. 1, and as later described with reference to FIGS. 12A, 12B, and 13.

In some embodiments, metadata corresponds to a set of data that describes and gives information about other data. The metadata may be stored in a digital format along with the media file on any kind of storage device capable of storing media files. The metadata may be implemented as any kind of annotation. For example the metadata may be implemented as a digital file having boolean flags, binary values, and/or textual descriptors and corresponding pointers to temporal indices within the media file. Alternatively or additionally, the metadata may be integrated into a video track and/or audio track of the media file. The metadata may thus be configured to cause the playback system to generate visual or audio cues. Example visual cues include displayed textual labels and/or icons, a color or hue of on-screen information (e.g., a subtitle or karaoke-style prompt), and/or any other displayed effect that can signal when displayed lip movement of a speaker correlates with audibly rendered speech. Example auditory cues include audibly rendered tones or effects, a change in loudness and/or pitch, and/or any other audibly rendered effect that can signal when displayed lip movement of a speaker correlates with audibly rendered speech.

Figure 3:
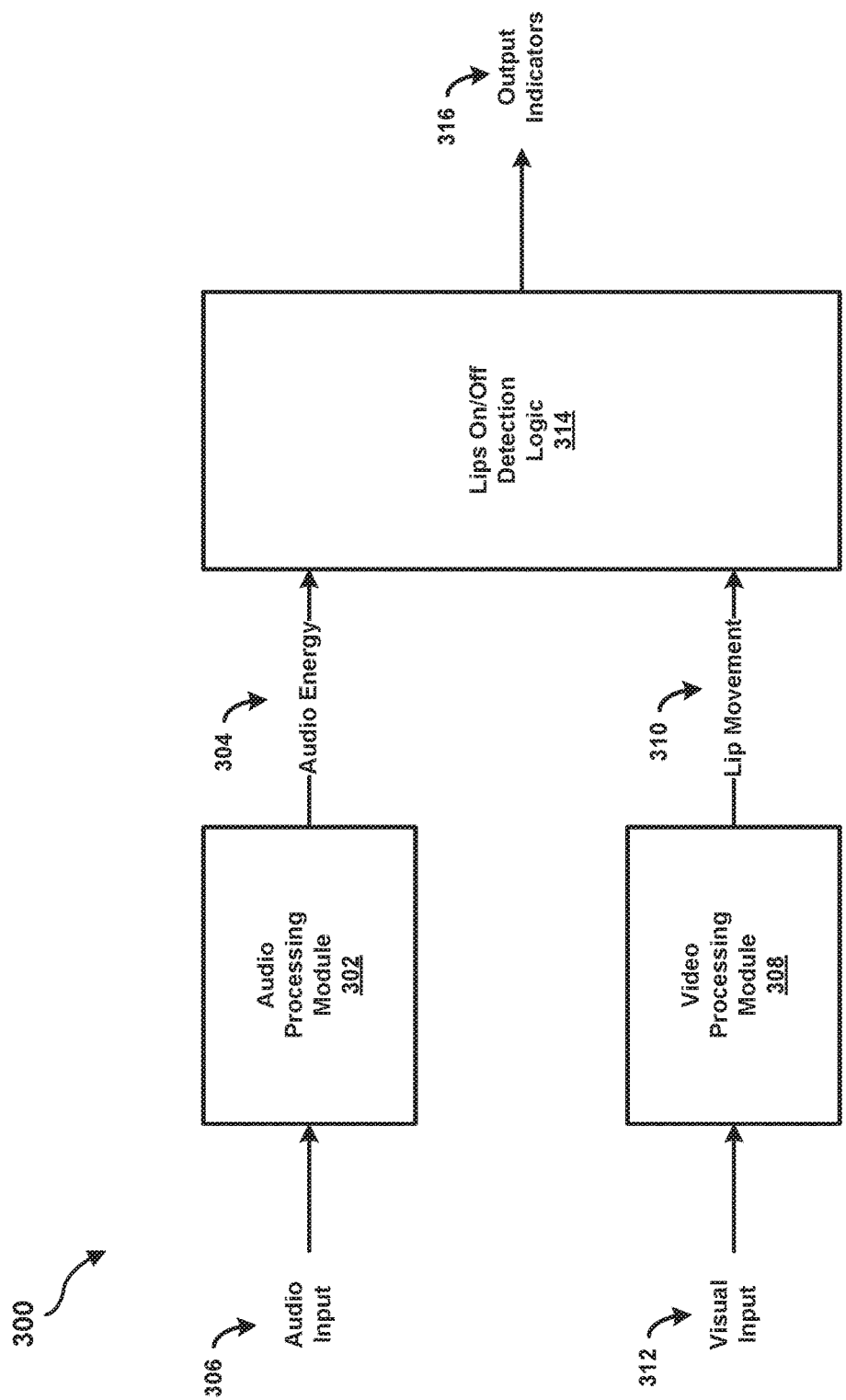
FIG. 3 is a block diagram of an exemplary speech detection system that measures audio energy of a media file, an exemplary video processing system that measures lip movement, and lips on/off detection logic in accordance with the present disclosure.

In some implementations of the disclosed speech detection system, the system may measure audio energy of an audio portion of a media file and correlate lip movement with the measured audio energy. Referring to FIG. 3, an exemplary speech detection system 300 has an audio processing module 302 that measures audio energy 304 of audio input 306 of a media file. System 300 also has a video processing module 308 that measures lip movement 310 of visual input 312 of the media file. In an example implementation, video processing module 308 obtains face landmarks and mouth closeness from the video.

In this example, audio input 306 and visual input 312 correspond to audio and video tracks of a multimedia video file. These synchronized audio and video tracks may be processed independently to measure audio energy 304 and lip movement 310 of segments of the media file. The results may be fed to lips on/off detection logic 314, which may merge the information from the two tracks and predict the on/off state for each set of lips detected. The term on/off state, in some embodiments, generally refers to a determination of whether there is a correlation between speech and lip movement in a segment. In this example, the on state signifies that there is a strong correlation, whereas the off state signals the opposite. These on/off states are used to generate output indicators 316 that may be recorded as metadata to the media file to indicate whether the lip movement of a segment correlates with the audio energy of the segment.

Detection of face landmarks may be performed in any suitable manner. Turning to FIG. 4, detection of face landmarks, as mentioned above, is carried out using a facial landmark detection utility. The term face landmarks, in some embodiments, generally refers to facial features that are detected and tracked by such a utility. Example face landmarks include lip contours, eye contours, nose contours, jaw contours, and individual points located on such contours. Face landmark detection may be performed in any suitable manner. For example, as shown in FIG. 4, a face landmark detection algorithm (the open source FACEMARK utility) may detect facial landmarks 1-68. Some visual speech recognition algorithms may use the lip contour points as shape features to recognize speech. However, instead of using these landmarks to recognize speech, the speech detection system may use height and width of the mouth as features for detecting lip movement. In particular, the ratio of the height and width of the mouth is determined as a mouth closeness indicator, where the lower value indicates closed lips. As an example, the height may be the distance between landmark numbers 67 and 63 in FIG. 4. Similarly, the width may be the distance between landmark numbers 55 and 49. Accordingly, an indicator (e.g., ratio) may be determined as follows:

$$\text{Indicator} = \text{distance}(\text{mark}_{67}, \text{mark}_{63}) / \text{distance}(\text{mark}_{55}, \text{mark}_{49}).$$

Figure 5:
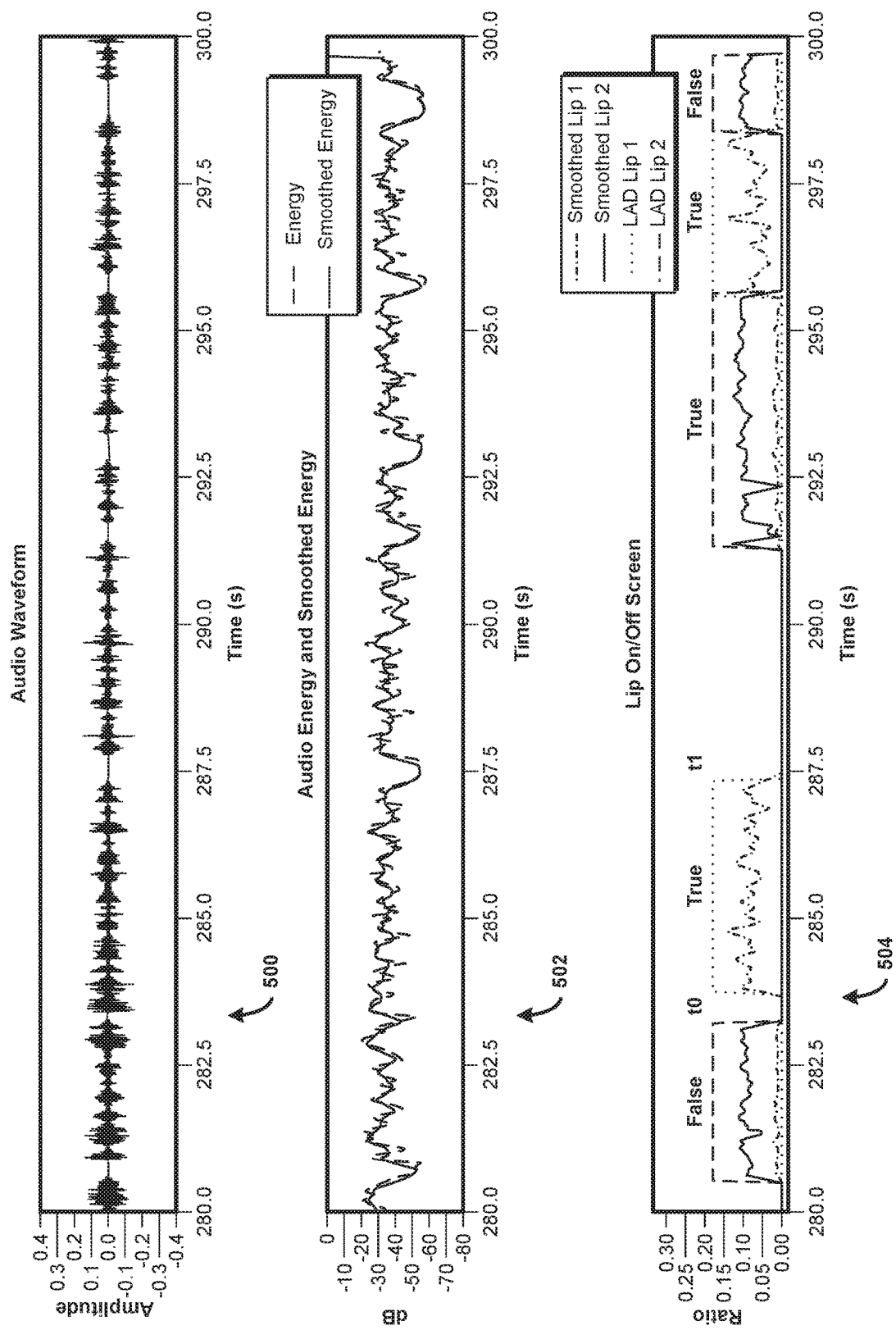
FIG. 5 is a graphical representation illustrating determination of the correlation between the speech and the lip movement of the speaker based on the audio energy of the media file in accordance with the present disclosure.

As noted, detected lip movement may be correlated with audio content energy, and the correlation may be calculated in any suitable manner. FIG. 5 provides a graphical representation of the steps involved in correlating audio energy with lip activity detection. As shown in FIG. 5, audio waveform 500 of an audio track of a media file may be graphed with time on the abscissa and amplitude on the ordinate axis. In this example, audio processing module 302 may calculate the energy of the audio represented in audio waveform 500 and may apply a smoothing filter (e.g., a moving-average filter) to the calculated energy. The raw and smoothed energy waveforms 502 are graphed with time on the abscissa and loudness on the ordinate axis in decibels. Meanwhile, video processing module 308 may calculate the indicators (e.g., ratios) for any sets of lips detected in the video track, and the lip indicators may be smoothed by a filter (e.g., a moving average filter). In the example shown in FIG. 5, video processing module 308 may smooth indicators for two different sets of lips (the smoothed indicators are represented as Smoothed Lip 1 and Smoothed Lip 2).

In some embodiments, video processing module 308 may use the smoothed lip indicators to calculate a binary lip activity detection (LAD) signal for each set of lips (the binary LAD signals are represented as LAD Lip 1 and LAD Lip 2). Video processing module 308 may calculate the lip activity detection by comparing a smoothed lip indicator against a fixed threshold (e.g., 0.02, 0.03, 0.04, and/or any other suitable threshold value) to produce a raw lip activity detection signal. The raw lip activity detection signal can be noisy and, thus video processing module 308 may further smooth this raw signal to remove short spikes. This smoothed lip activity signal may be represented as a binary indicator that indicates the lips are either open or closed, as shown in Lip On/Off Screen 504.

Video processing module 308 and/or audio processing module 302 may apply any suitable type or form of smoothing filter to the audio energy and/or lip activity detection (LAD). For example, in some embodiments, a smoothing filter may be a low pass filter that modifies data points of a signal so that individual points higher than the adjacent points (presumably because of noise) are reduced, and points that are lower than the adjacent points are increased. A smoothing filter may be implemented as one or more of a low pass filter, a moving average filter, an additive smoothing filter, a Butterworth filter, a Chebyshev filter, a digital filter, an elliptic filter, an exponential smoothing filter, a Kalman filter, a Kernal smoother, a Kolmogorov-Zerbenko filter, a Laplacian smoothing filter, a local regression filter, a Ramer-Douglas-Peuker filter, a Savitzky-Golay filter, a smoothing spline filter, a stretched grid filter, etc.

In some embodiments, lip activity detection may involve boundary detection. The term boundary may generally refer to lines that mark the limits of an area and act as dividing lines between areas of the detected lip activity. For example, from the binary smoothed lip activity detection, lips on/off detection logic 314 may detect boundaries of segments and may then segment the lip movement based on the detected boundaries. For example, the video processing module 308 may detect boundaries at time indices of the video track at which the smoothed lip indicator crosses the fixed threshold. Video processing module 308 may thus define the segments between the boundaries. An example of such a segment is shown starting at time t0 and ending at time t1, as shown in lip on/off screen 504 in FIG. 5. These two time indices (t0 and t1) are the starting and ending points of one particular segment.

The term lip movement, in some embodiments, generally refers to any kind of lip movement detected in the video content of the media file. For example, lip movement may refer to landmark values, raw lip indicators, smoothed lip indicators, raw lip activity, smoothed lip activity, segmented lip activity, or any other kind of lip movement observed in the video content of the media file. Additionally, any part or portion of the lip movement measurement process (e.g., landmark value detection, ratio calculation, smoothing, threshold comparison, segmentation, etc.) may be performed either by video processing module 308 or lips on/off detection logic 314.

Continuing with the example shown in FIG. 5, once audio processing module 302 has processed and smoothed the audio energy, and once video processing module 308 has provided lip movement 310, lips on/off detection logic 314 may correlate the smoothed audio energy with the detected lip activity. For each segment of lip activity detected from the above procedures, lips on/off detection logic 314 may calculate the standard variance of the corresponding lip movement. For example, lips on/off detection logic 314 may determine the standard variance of a segment in part by calculating differences between ratio values of the segment and a mean of the ratio values of the segment.

The term ratio value, in some embodiments, generally refers to the ratio of the mouth height to mouth width as detailed above with reference to FIG. 4. Additionally, the mean of the ratio values generally refers to an average of the ratio values of the segment. Furthermore, the term squared difference, in some embodiments, generally refers to a difference between a ratio value and the mean, multiplied by itself.

Lips on/off detection logic 314 may determine the standard variance of a segment in part by calculating squared differences for the segment. Also, lips on/off detection logic 314 may determine a value of the standard variance of the segment as an average of the squared differences. If the value of the standard variance is above a heuristic threshold, then lips on/off detection logic 314 may determine that the lips are moving. As a counter example, a speaker may keep his or her mouth open without saying anything; in this case the standard variance will be close to zero.

For each segment, lips on/off detection logic 314 may additionally calculate the maximum cross-correlation $\hat{R}_{xy}$(m) for correlation metric m between lip movement y of the segment and the smoothed energy x of the segment as follows:

$$\hat{R}xy(m) = \begin{cases} \sum_{n=0}^{N-m-1} x_{n+m} y_n^*, & m \geq 0, \\ \hat{R}^* yx(-m), & m < 0. \end{cases}$$

Here, lips on/off detection logic 314 may extend the energy window backward and forward (e.g., one millisecond, or any other suitable amount, on each end) to cover the possible audio and video mis-sync. Lips on/off detection logic 314 may determine that the visual lip is probably moving synchronized with the audio within the same window in response to the maximum cross-correlation value for that window rising above a predetermined threshold.

Finally, lips on/off detection logic 314 may combine the binary results from the variance and cross-correlation assessments. Lips on/off detection logic 314 may assign a boolean true value flag to a segment if the variance of the segment is above the heuristic threshold and the cross-correlation is above the predetermined threshold. Otherwise, lips on/off detection logic 314 may assign a boolean false screen flag to the segment. These boolean flags may correspond to the output indicators that are recorded as metadata for the media file.

The phrase "segment of the media file," in some embodiments, generally refers to any part of the media file in which lip movement is either detected or not detected. As explained, a video processing module may identify these segments based on the detection of lip movement. Alternatively, an audio processing module may form segments of the media file based on detection of voice activity as detailed below with reference to FIG. 6-11. As another alternative, a video processing module may segment the media file based on predefined frames or chunks of frames of the media file. Accordingly, a video processing module may determine presence or absence of lip movement for each of these predefined segments or for particular ones of these predefined segments (e.g., in which voice activity is detected).

Figure 6:
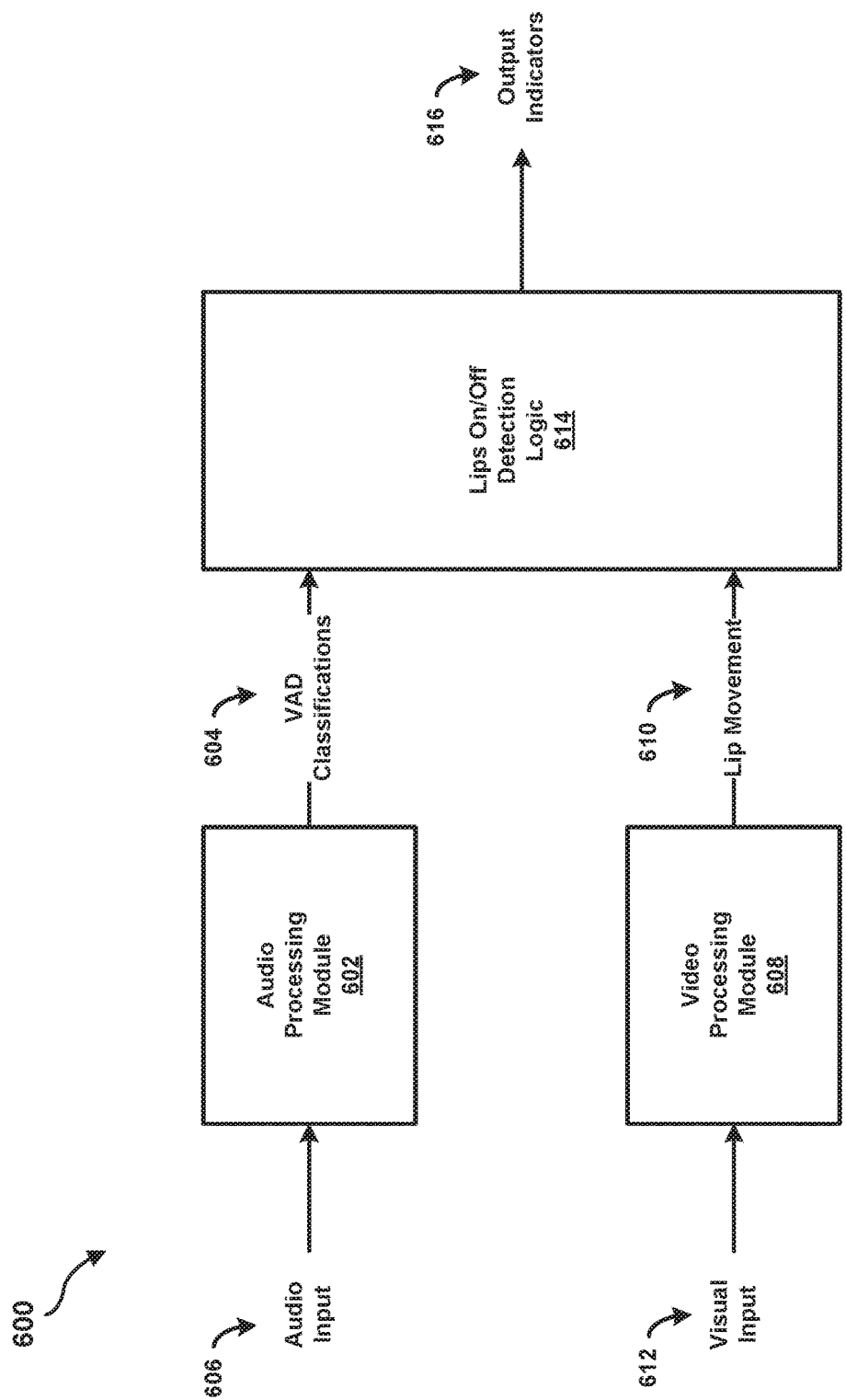
FIG. 6 is a block diagram of an exemplary speech detection system that performs voice activity detection (VAD) of audio content of the media file using a VAD algorithm in accordance with the present disclosure.

In some embodiments, instead of calculating audio energy, the systems described herein may perform voice activity detection. Turning to FIG. 6, an exemplary speech detection system 600 has an audio processing module 602 that performs voice activity detection. Also known as speech activity detection or speech detection, voice activity detection is a technique used in speech processing in which the presence or absence of human speech is detected.

In some examples, a voice activity detection algorithm may implement a noise reduction stage (e.g., spectral subtraction) as a first stage. Then, features or quantities are calculated from a section of the input signal. A classification rule is then applied to classify the section as speech or non-speech. Often, this classification rule finds when a value exceeds a threshold. Some voice activity detection techniques may use a classifier to make speech/non-speech predictions about each audio frame independently, together with a temporal smoothing scheme to reduce noise in the classifier's output.

Audio processing module 602 may perform voice activity detection by applying a voice activity detection algorithm to audio input 606 of a media file to produce voice activity detection classifications 604. Speech detection system 600 may also include a video processing module 608 that measures lip movement 610 of visual input 612 of the media file. In an example implementation, video processing module 608 obtains face landmarks and mouth closeness from the video in a same or similar manner as video processing module 308 as described herein with reference to FIGS. 3-5.

As in the example in FIG. 3, audio input 606 and visual input 612 respectively correspond to audio and video tracks of a multitrack video file. These synchronized audio and video tracks are processed independently to produce voice activity detection classifications 604 and to measure lip movement 610 within segments of the media file. The results may be provided to lips on/off detection logic 614, which may merge the information from the two tracks and predict the on/off state for each set of lips detected. Lips on/off detection logic 614 may use these on/off states to generate output indicators 616 and record these output indicators 616 as metadata to the media file. For speech detection system 600, the metadata may indicate whether the lip movement 610 of a segment or frame correlates with the voice activity detection classifications 604 of the segment or frame.

Figure 7A:
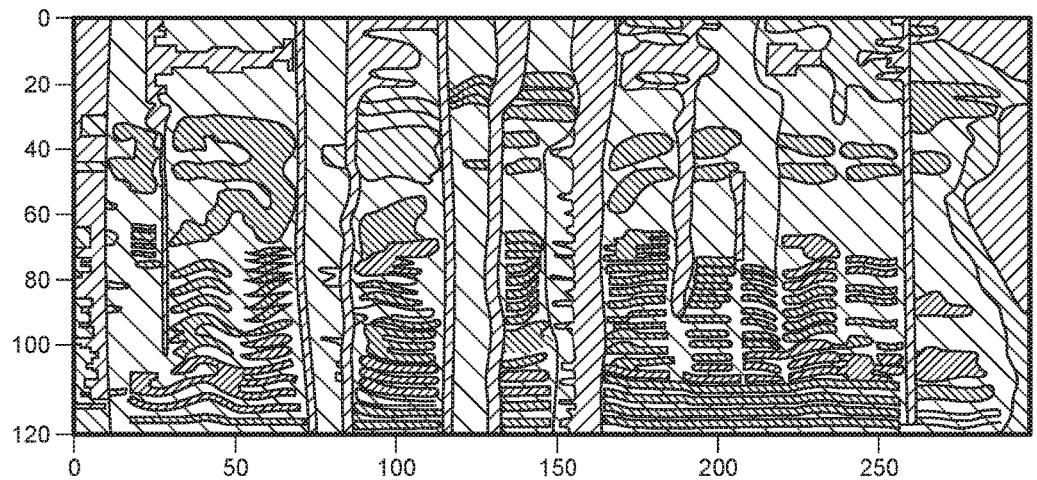
FIG. 7A is a graphical representation of a log-mel energy spectrum image of audio features extracted by a VAD algorithm in accordance with the present disclosure.

Audio processing module 602 may extract audio features in any suitable manner. Turning to FIG. 7A, audio processing module 602 may extract audio features (e.g., frequency and audio energy) from audio input 606 to generate a spectrogram of the audio features. A spectrogram may be a visual representation of the spectrum of frequencies of a signal as it varies with time. When applied to an audio signal, spectrograms may be referred to as sonographs, voiceprints, or voicegrams. When the data is represented in a 3D plot, spectrograms may be referred to as waterfalls.

Audio processing module 602 can generate a spectrogram by an optical spectrometer, a bank of band pass filters, by Fourier transform, or by a wavelet transform (in which case it is also known as a scalogram). A spectrogram is usually depicted as a heat map, which may be an image with the intensity shown by varying the color or brightness. Accordingly, a common format for a spectrogram is a graph with two geometric dimensions, in which one axis represents time, and the other axis represents frequency. A third dimension indicating the energy of a particular frequency at a particular time is represented by the intensity or color of each point in the image.

Furthermore, in the above embodiments, calculating the spectrogram may include performing a logarithmic function to convert the frequency spectrum to a mel scale, extracting frequency bands by applying the filter banks to each power spectrum, performing an additional transformation to the filter banks to decorrelate the coefficients of the filter banks, and/or computing a new set of coefficients from the transformed filter banks. In some embodiments, the additional transformation may include the logarithmic function. In other examples, the additional transformation may include a discrete cosine transform and/or other data transformations. In some examples, the term "mel scale" or "log-mel" may generally refer to a scale of sounds as judged by human listeners, thereby mimicking the range of human hearing and human ability to distinguish between pitches. For example, the disclosed systems may use a set of 64 mel frequencies to derive a 64-dimensional feature or use a set of 128 mel frequencies to derive a 128-dimensional feature. Audio processing module 602 may, in some implementations, generate a log-mel energy spectrum image of the audio features. The features of such an energy spectrum image are graphed in FIG. 7A with frame number on the abscissa and mel-frequency bin number on the ordinate axis.

Figure 7B:
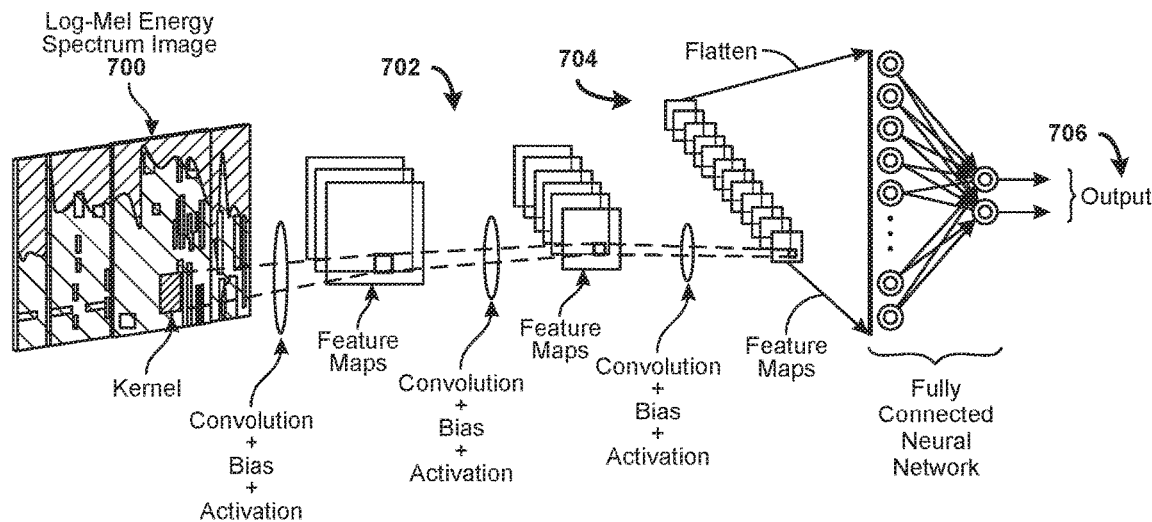
FIG. 7B is a diagrammatic view of procedural components of a convolutional neural network (CNN) VAD algorithm in accordance with the present disclosure.
Figure 7C:
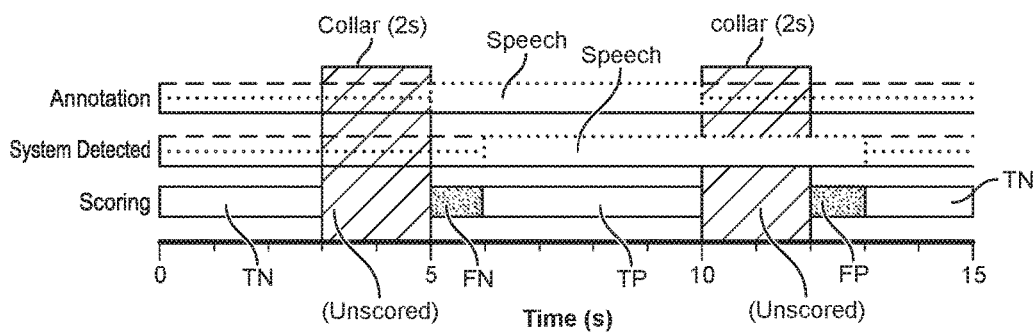
FIG. 7C is a graphical illustration of the relationship between human annotation, scored regions that result from application of collars, a possible system output, and resulting time intervals in accordance with the present disclosure.

Referring to FIG. 7B, audio processing module 602 may use a log-mel energy spectrum image as an input to a convolutional neural network (CNN) voice activity detection algorithm. In some embodiments, the term CNN generally refers to any type or form of deep neural networks. In FIG. 7B, the log-mel energy spectrum image 700 is input to CNN convolutional layers 702. The output 704 of the final layer may be flattened into a vector and fed into a fully connected layer with softmax as activation. The output 706 of the model may be the probability of voice/non-voice for each input frame.

Various different voice activity detection algorithms with various different properties may be implemented in the systems presented herein. These different types of VAD algorithms may be evaluated and compared in a variety of ways. For example, referring to FIG. 7C, scoring may be performed on VAD classifications obtained using each of three different types of VAD algorithms on a same test speech. In some embodiments, human annotation with application of collars may be used to identify VAD errors and determine error rates of the different algorithms. The relationship between human annotation, the scored regions that result from application of the collars, a possible system output, and the resulting time intervals are shown. The relationship is scored as true negative TN (i.e., correctly identified regions of non-speech), true positive TP (i.e., correctly identified regions of speech), false negative FN (i.e., miss), and false positive FP (i.e., false alarm) time. The scoring collars also compensate for ambiguities in noisy channel annotation. Non-speech collars of two seconds in length, shown above the annotation, define regions that will not be scored. As can be seen, collars are applied to the annotations to determine the parts of the speech and non-speech that are scored.

For each system output for each input file, two error rates are calculated. Scored regions define the denominators in the miss and false alarm rate equations shown below.

Miss rate $(P_{Miss})$=total FN time/total speech time

False alarm rate $(P_{FA})$=total FP time/total scored nonspeech time

With $P_{Miss}$ and $P_{FA}$ as defined above, the system may be implemented to minimize the following Detection Cost Function (DCF) metric:

$$DCF(\Theta)=0.75*P_{Miss}(\Theta)+0.25*P_{FA}(\Theta)$$

Figure 8:
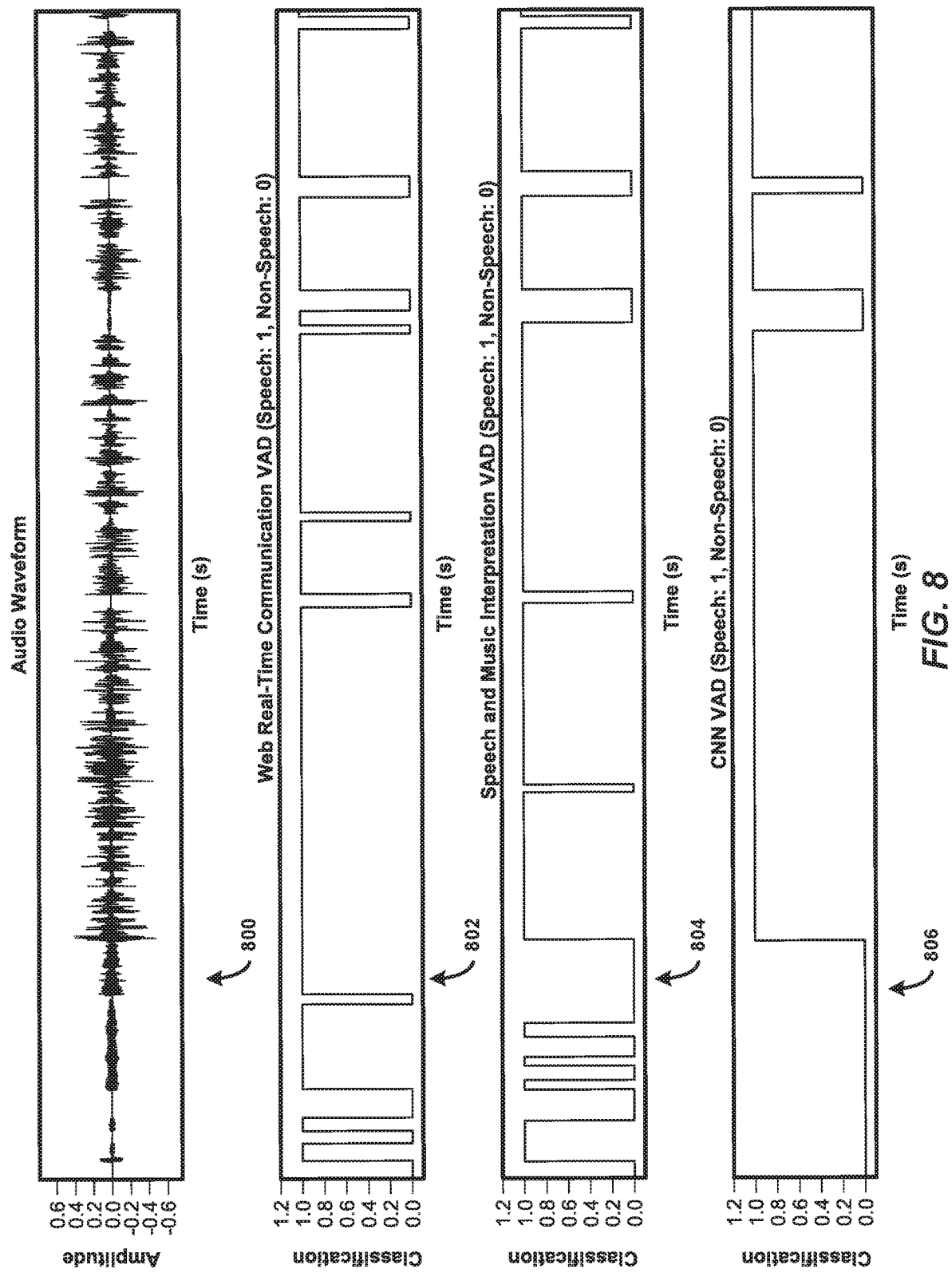
FIG. 8 is a graphical illustration depicting a comparison of outputs from three different VAD algorithms in accordance with the present disclosure.

As noted above, different types of voice activity detection algorithms may be evaluated by applying the different types of voice activity algorithms to a given test speech and producing different results for evaluation. Turning to FIG. 8, outputs from three different types of voice activity detection (VAD) algorithms are illustrated for comparison. The three different types VAD algorithms correspond to speech and music interpretation by large-space extraction (e.g., OPENSMILE) VAD algorithm, a web real-time communication (WEBRTC) VAD algorithm, and a convolutional neural network (CNN) VAD algorithm. A test audio waveform 800 is graphed with time on the abscissa and amplitude on the ordinate axis. Outputs 802-806 respectively produced by the web real-time communication VAD algorithm, the speech and music interpretation VAD algorithm, and the CNN VAD algorithm are graphed with time on the abscissa and the probability of voice/non-voice on the ordinate axis.

A speech and music interpretation by large-space extraction VAD algorithm may automatically extract features from audio signals for classification of speech and music signals. Such a VAD algorithm may automatically analyze speech and music signals in real-time. In contrast to automatic speech recognition which extracts the spoken content out of a speech signal, this type of VAD algorithm recognizes the characteristics of a given speech or music segment. Examples for such characteristics encoded in human speech are a speaker's emotion, age, gender, and personality, as well as speaker states like depression, intoxication, or vocal pathological disorders. VAD algorithms of this type may implement a neural network approach and employ an extensive training corpus.

Another type of VAD algorithm (e.g., WEBRTC) may provide web browsers and mobile applications with real-time communication (RTC) via simple application programming interfaces (APIs). This type of VAD algorithm allows audio and video communication to work inside web pages by allowing direct peer-to-peer communication, eliminating the need to install plugins or download native applications. This type of VAD algorithm may also provide various modules, including a VAD module that uses frequency band features and a pre-trained Gaussian Mixture Model (GMM) classifier. In some embodiments, this type of VAD algorithm may be a fast, lightweight VAD algorithm capable of running on smart watches and other mobile devices with limited computational resources.

Figure 9:
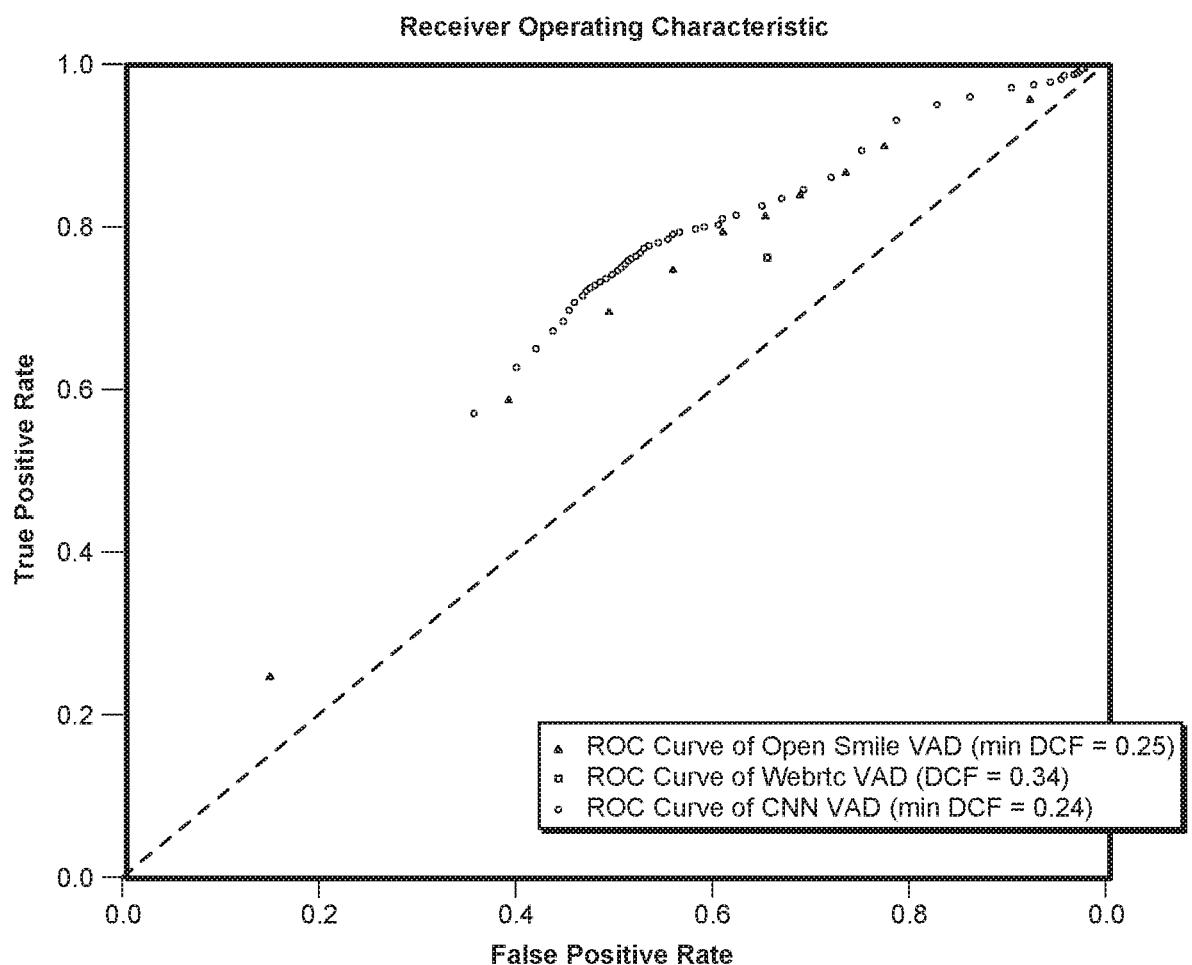
FIG. 9 is a graphical representation of receiver operating characteristic (ROC) curves of three different VAD algorithms in accordance with the present disclosure.

As shown in FIG. 8, CNN VAD output 806 may exhibit less variability in the probability of voice/non-voice over time compared to web real-time communication VAD 802 and speech and music interpretation VAD output 804. Referring also to FIG. 9, in some embodiments a receiver operating characteristic of the CNN VAD algorithm may yield a better true positive rate compared to the OPENSMILE VAD algorithm and the WEBRTC VAD algorithm under test conditions simulating a dubbing process. Based on these observed characteristics, the CNN VAD algorithm may advantageous in predicting speech for dubbing purposes in some embodiments.

Figure 10:
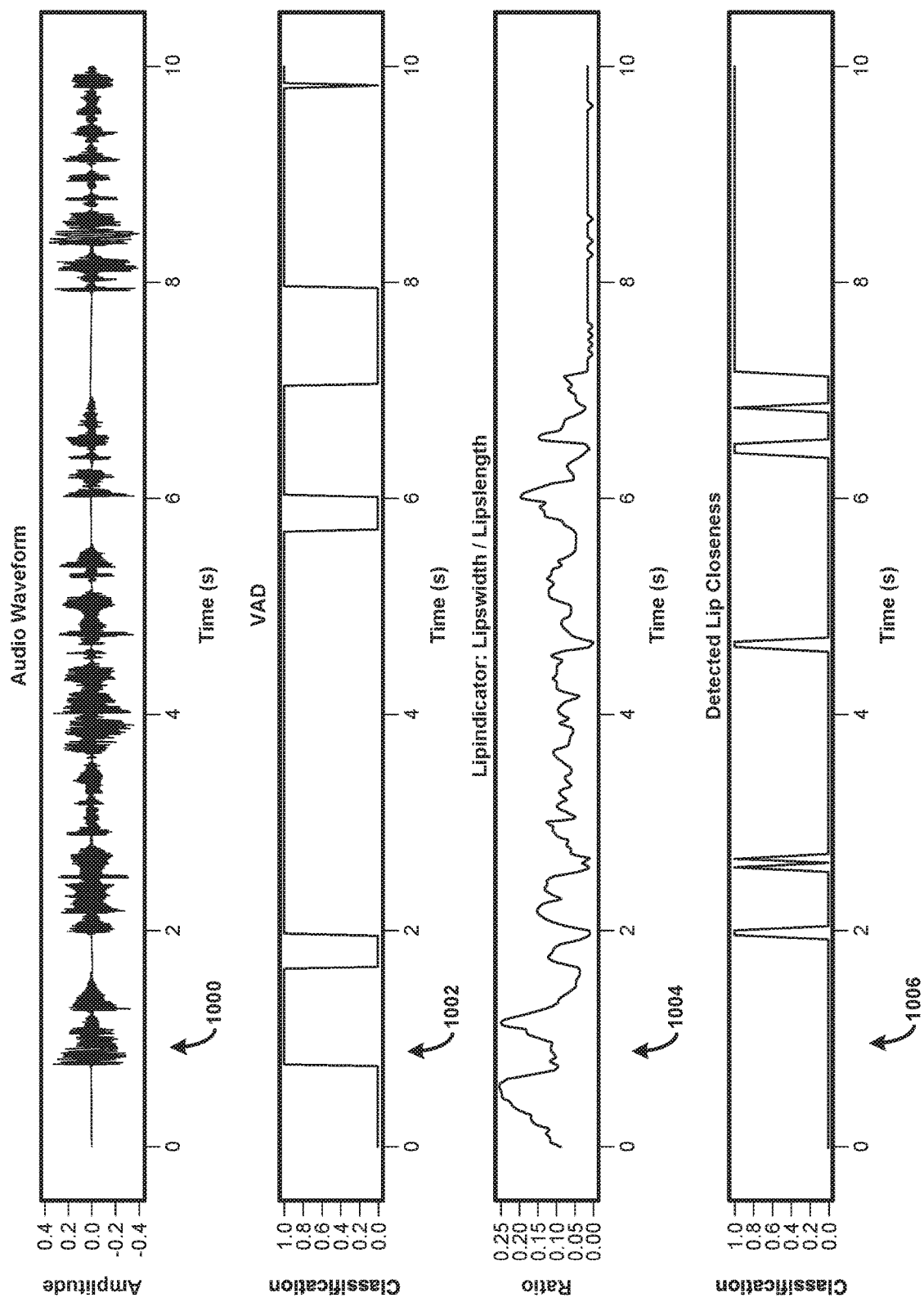
FIG. 10 is a graphical representation illustrating determination of the correlation between the speech and the lip movement of the speaker based on performance of VAD of audio content of the media file using a VAD algorithm in accordance with the present disclosure.

Speech detection system 600 may correlate lip movement with detected voice activity in any suitable manner. Turning to FIG. 10, determination of the correlation between the speech and the lip movement of the speaker based on performance of VAD of audio content of the media file using a VAD algorithm is shown in more detail. The audio waveform 1000 of the audio track of the media file is graphed with time on the abscissa and amplitude on the ordinate axis. Audio processing module 602 performs VAD of the audio track using a VAD algorithm, such as a CNN VAD algorithm. The VAD results 1002 are graphed with time on the abscissa and the probability of voice/non-voice on the ordinate axis. Meanwhile, video processing module 608 calculates the indicators (e.g., ratios) for a particular set of lips detected in the video track. The lip indicator is smoothed by a moving average filter of any suitable length. The smoothed indicator 1004 is graphed with time on the abscissa and ratio value on the ordinate axis.

Video processing module 608 performs lip activity detection (LAD) by comparing the smoothed indicator against a fixed threshold to produce a raw LAD. The raw LAD can be noisy and, thus, video processing module 608 may further smooth the raw LAD to remove short spikes. The smoothed LAD for the detected set of lips is binary, indicating that the lips are either open or closed. The results are graphed at 1006. From these binary smoothed LAD, video processing module 608 detects boundaries and segments the detected lip activity. For example, video processing module 608 may detect boundaries at time indices of the video track at which the smoothed lip indicator crosses the fixed threshold. Accordingly, video processing module 608 may define segments between the detected boundaries.

For each segment detected from the above procedures, lips on/off detection logic 614 may generate a boolean true flag for those segments in which voice activity was also detected. Alternatively or additionally, lips on/off detection logic 614 may calculate the standard variance of each lip movement in the same or similar manner as described herein with reference to FIG. 5. As previously described, lips on/off detection logic 614 may determine the standard variance of a segment. Accordingly, lips on/off detection logic 614 may determine that the lip is moving in a segment in response to the value of the standard variance for that segment rising above a heuristic threshold. Accordingly, lips on/off detection logic 614 may, for each segment exhibiting a variance above the heuristic threshold, generate a boolean true screen flag for those segments in which voice activity was also detected.

Lips on/off detection logic 614 may correlate the detected lip activity for a segment using additional or alternative criteria. For example, lips on/off detection logic 614 may employ speaker recognition to determine whether the detected voice activity corresponds to the detected set of lips. For each set of lips, lips on/off detection logic 614 may recognize a speaker for a set of lips based on lip shape. Alternatively or additionally, lips on/off detection logic 614 may recognize a speaker for a set of lips using facial recognition of a face rendered in a screen region corresponding to detected facial landmarks that include the set of lips. For each audio frame of detected voice activity, lips on/off screen detection logic 614 may also recognize a speaker using a voice print developed for the speaker and/or VAD detection results that include known speaker characteristics (e.g., age, gender, personality, etc.). Accordingly, lips on/off detection logic 614 may correlate lip movement with the detected voice activity in response to determining that a speaker for the audio frame(s) of detected voice activity matches a speaker for a set of lips resulting in the detected lip movement. Lips on/off detection logic 614 may make the correlation based on speaker recognition alone or in combination with other criteria as described herein. As in the previous example, lips on/off detection logic 614 may generate boolean flags that correspond to the output indicators 616 and may record these output indicators 614 as metadata for the media file. Lips on/off detection logic 614 may also generate any other suitable types or forms of lips on/off indicators.

Figure 11:
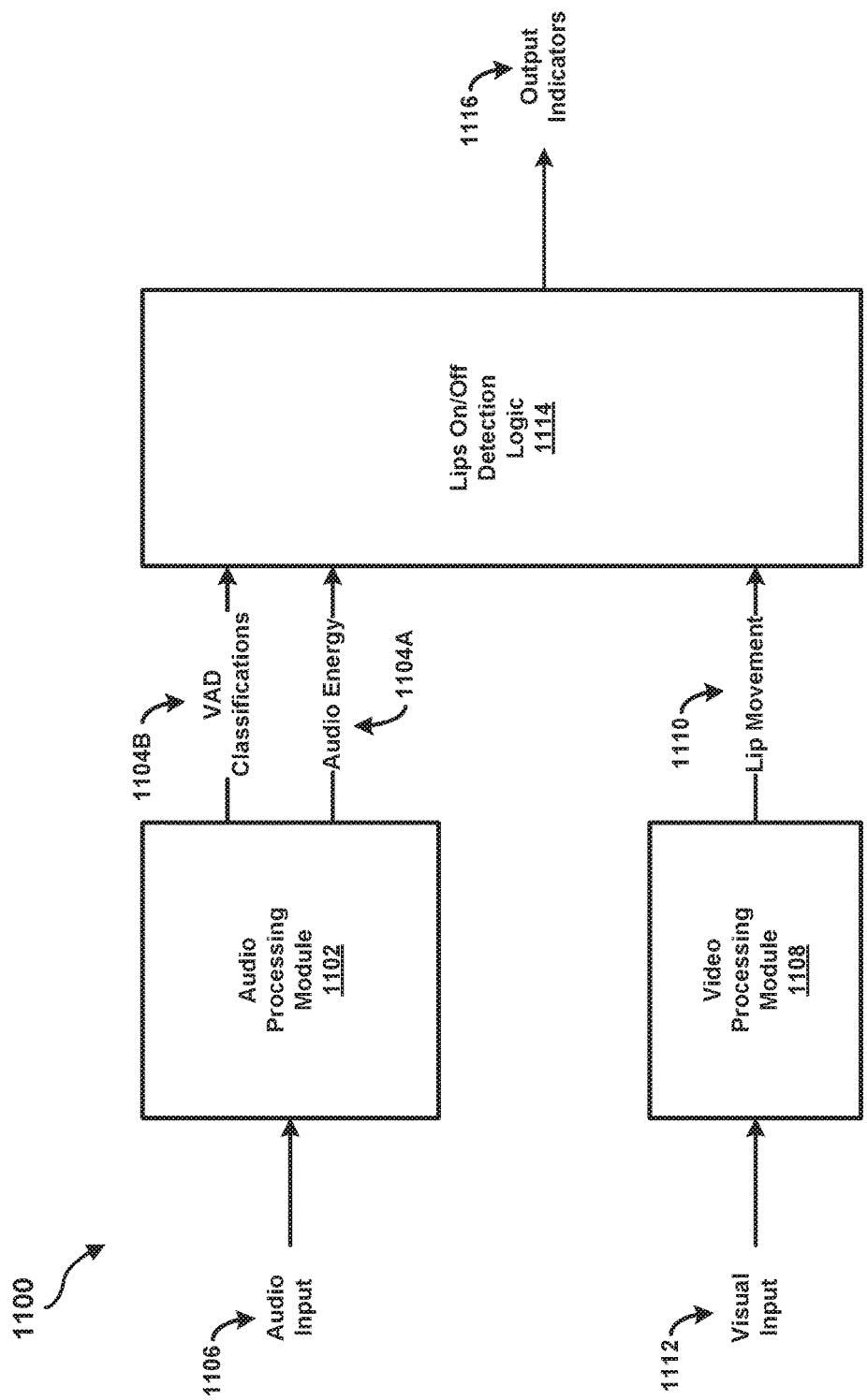
FIG. 11 is a block diagram of an exemplary speech detection system that performs VAD of audio content of the media file and also measures audio energy of the media file in accordance with the present disclosure.

The preceding description details speech detection systems 300 and 600 that utilize audio energy and VAD, respectively. Some embodiments may also provide a speech detection system that utilizes audio energy and VAD in combination. A speech detection system that employs both audio energy measurements and VAD classifications may be implemented in any suitable manner. Turning to FIG. 11, an exemplary speech detection system 1100 has an audio processing module 1102 that measures audio energy 1104A of audio input 1106 of a media file, and also performs VAD on the audio input 1106 to obtain VAD classifiers 1104B as previously described. The speech detection system 1100 additionally has a video processing module 1108 that measures lip movement 1110 of visual input 1112 of the media file, also as previously described. In various examples, the lips on/off detection logic 1114 combines the audio energy 1104A, VAD classifiers 1104B, and lip movement 1110 in different ways.

In one example, lips on/off detection logic 1114 uses the VAD classifiers 1104B to mark the beginning and end points of speech for the transcriptionist. Alternatively or additionally, lips on/off detection logic 1114 may use the VAD classifiers to assign a boolean true value flag to a segment if the variance of the segment is above the heuristic threshold and the cross-correlation is above the predetermined threshold, as detailed above with reference to FIG. 3. Accordingly, lips on/off detection logic 1114 may generate multiple types of output indicators 1116 and record these indicators as metadata for the media file. In this way, lips on/off detection logic 1114 may provide different types of indicators based on the VAD classifiers 1104B and the correlation of lip movement 1110 with the audio energy 1104A.

In some examples, lips on/off detection logic 1114 may use the VAD classifiers 1104B in additional or alternative ways. For example, the on/off detection logic 1114 may determine the segments of lip movement only for the portions of the media file in which speech activity is detected. Alternatively, for segments that are determined to have a boolean true value flag, but that correspond to portions of the media file in which speech activity is not detected, lips on/off detection logic 1114 may flag those segments for quality control review. Alternatively or additionally, lips on/off detection logic 1114 may use the VAD classifier or classifiers to weight the cross-correlation metric and/or adjust the heuristic threshold for that segment. These operations may be carried out by the lips on/off detection logic 1114 in various combinations.

Figure 12A:
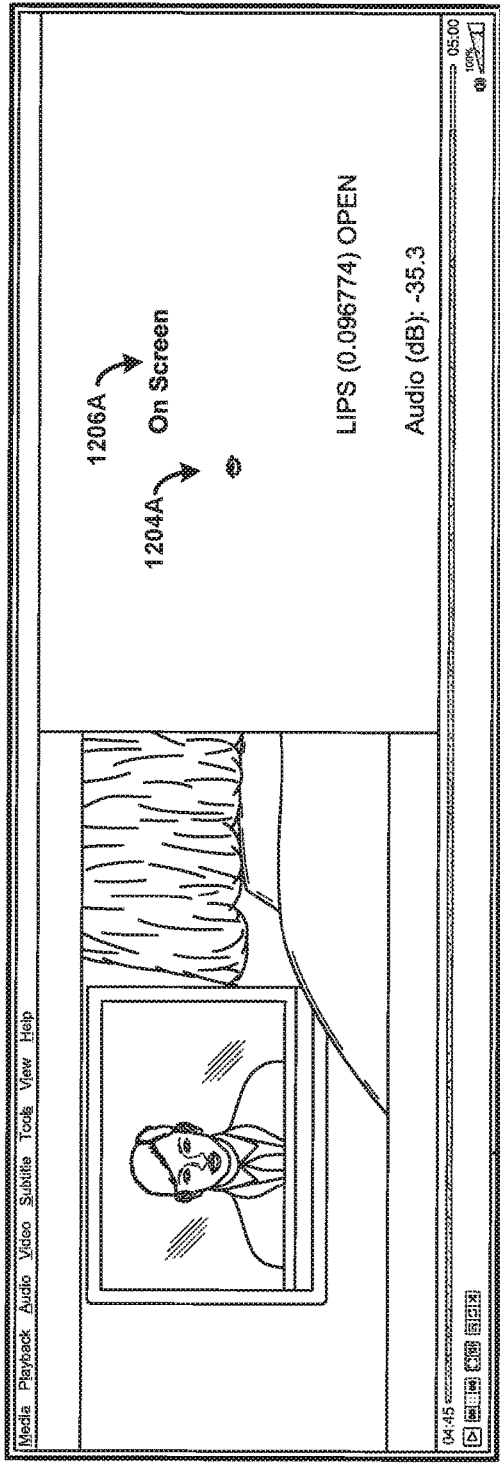
FIG. 12A is a graphical representation of an example signaling of the correlation based on the metadata in accordance with the present disclosure.
Figure 12B:
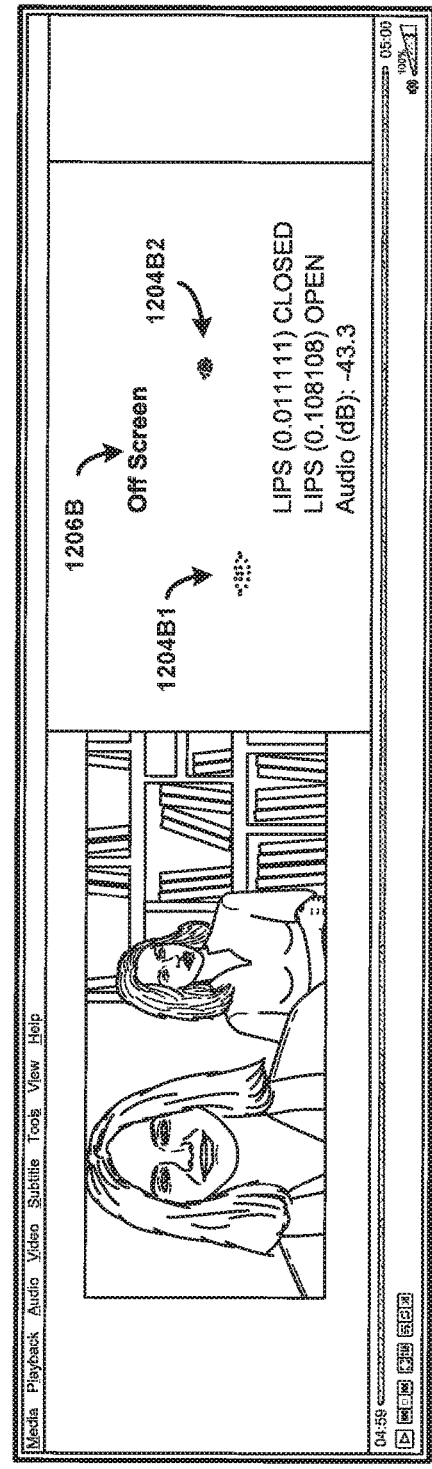
FIG. 12B is a graphical representation of another example signaling of a lack of correlation based on the metadata in accordance with the present disclosure.

During playback of the media file, the correlation may be signaled based on the metadata in any suitable manner. Turning to FIGS. 12A and 12B and referring generally thereto, an example signaling of the correlation based on the metadata is shown. When the media file having the metadata is played back by a system, that playback system may visually render the video portion of the media file on an active display at 1200A and 1200B while outputting the audio portion of the media file. Simultaneously, the playback system may display, on another screen region (e.g., at 1202A and 1202B) an animation 1204A, 1204B1, and 1204B2 of one or more sets of lips detected in the video. The other screen region 1202A and 1202B may also contain textual information, including indicators 1206A and 1206B signaling the temporal correlation between the speech of the audio portion of the media file and the lip movement of the speaker. For example, a speaker shown at 1200A has lip movement that correlates with the speech in the audio portion of the media file. Accordingly, the indicator 1206A signals this correlation to a viewer by indicating that the lips are on screen. In contrast, other speakers shown at 1200B are currently listening to a voice over corresponding to speech of the speaker shown at 1200A. As a result, the lip movement of the other speakers shown at 1200B does not correlate with the speech content of the voice over. Accordingly, the indicator 1206B signals this lack of correlation to the viewer by indicating that the lips are off screen. It should be understood that the metadata that causes the system to communicate the indicators may cause the playback system to signal visual and/or auditory indicators as will be readily apparent to one skilled in the art. Additionally, it should be understood that the metadata may be implemented as data that tags a segment of the media file, implemented as visual content added to the video portion of the media file, and/or implemented as audio content added to the audio portion of the media file.

Figure 13:
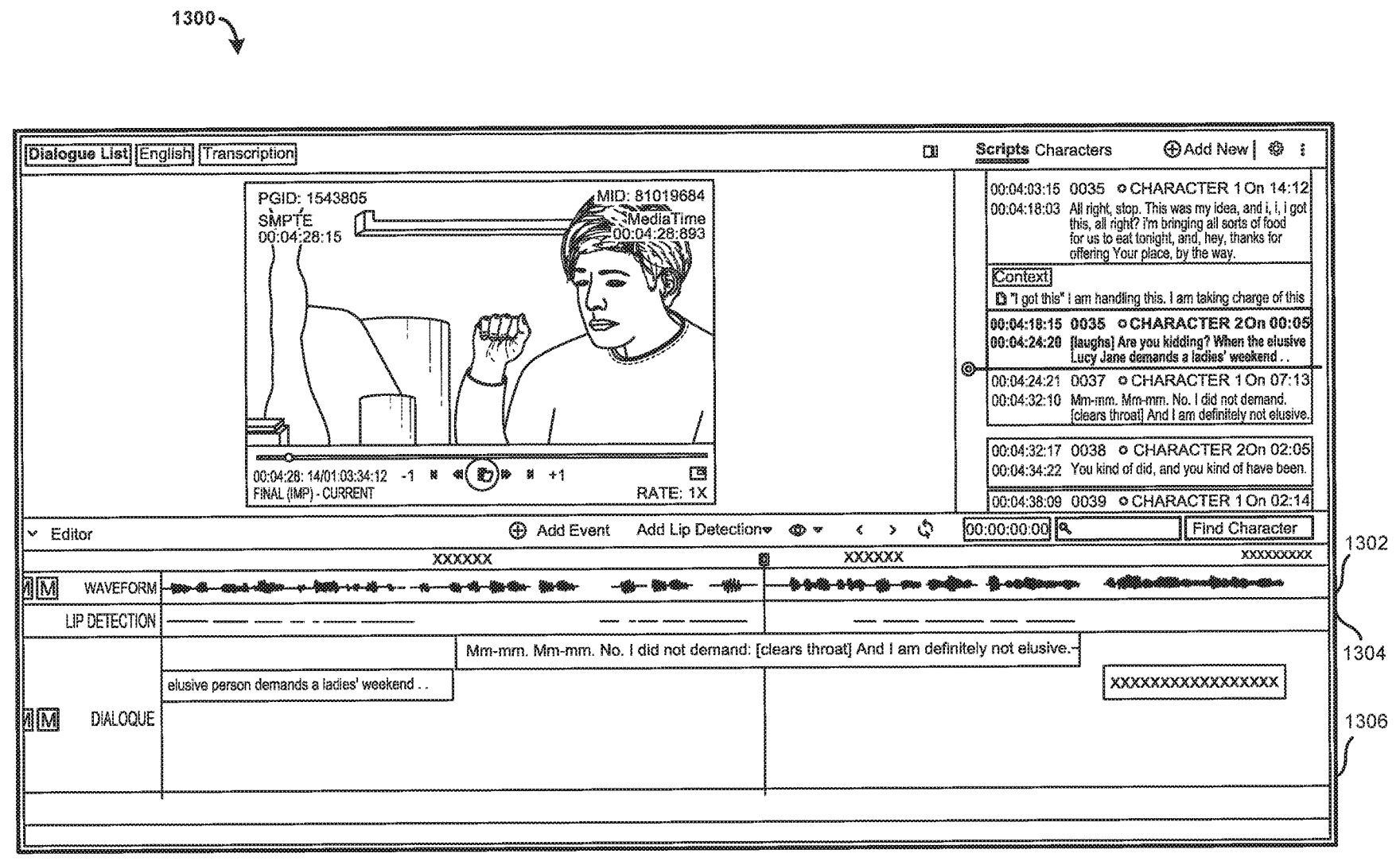

Another example of presenting lip detection to a user is shown in FIG. 13. In the example shown in FIG. 13, a software interface 1300 may present an audio waveform window 1302 in a timeline with corresponding lip on/off detection window 1304 and dialogue window 1306. In this example, lip on/off detection for on-screen speakers may be presented as a binary marker in lip on/off detection window 1304. In other embodiments, lip on/off detection may be presented in any other suitable manner.

As may be appreciated from the above detailed descriptions, the systems and methods described herein may assist persons involved in a dubbing process by configuring a media file to signal correlation between speech and lip movement during playback of the media file. This information may be helpful in guiding a translator to those portions of the original dialogue that strongly correlate with lip movement displayed onscreen. Accordingly, the translator may focus on the cadence and timing of these portions during the translation process and make selections of dialogue translations that assist a director in matching the cadence and timing of the translated dialogue to the on screen lip movement. The translator is also enabled to more easily recognize when original dialogue does not strongly correlate to displayed lip movement, and thus translate those portions of the dialogue more freely and efficiently. Thus, the translation process may be rendered more efficient without diminishing the quality of the cadence and timing synchrony aspect of the translation. Similarly, directors may more efficiently and accurately direct voice actors, and the metadata may also be fed into a karaoke style direction system to aid in generating timing and cadence of prompts displayed to voice actors.

Example Embodiments

1. A computer-implemented method comprising: analyzing, by a speech detection system, a media file to detect lip movement of a speaker who is visually rendered in media content of the media file; identifying, by the speech detection system, audio content within the media file; and improving accuracy of a temporal correlation of the speech detection system by: correlating the lip movement of the speaker with the audio content; determining, based on the correlation between the lip movement of the speaker and the audio content, that the audio content comprises speech from the speaker; and recording, based on the determination that the audio content comprises speech from the speaker, the temporal correlation between the speech and the lip movement of the speaker as metadata of the media file.

2. The method of claim 1, wherein analyzing the media file to detect lip movement of the speaker includes: identifying one or more segments of the media file in which lips of the speaker are open based on a ratio of mouth height to mouth width; determining a standard variance of the one or more segments by measuring an average spread of ratio values of a segment from a mean of the ratio values of the segment; and detecting lip movement in the one or more segments for which the standard variance exceeds a threshold.

3. The method of claim 2, wherein identifying the audio content includes calculating energy values of the audio content of the one or more segments.

4. The method of claim 3, wherein correlating the lip movement of the speaker with the audio content includes determining a cross-correlation between the lip movement and energy values for the segment by measuring similarity of a summed sequence of the ratio values of the segment as a function of displacement of that summed sequence with respect to another summed sequence of the energy values for the segment.

5. The method of claim 4, wherein determining that the audio content comprises speech from the speaker includes determining one or more segments of the media file at which the cross-correlation exceeds a threshold.

6. The method of claim 1, wherein identifying the audio content includes performing voice activity detection (VAD) of the media file using a VAD algorithm that employs a classifier to make predictions of speech and non-speech for one or more individual audio frames.

7. The method of claim 6, wherein correlating the lip movement of the speaker with the audio content includes identifying one or more segments of the media file at which both lip movement and voice activity are detected.

8. The method of claim 7, wherein determining that the audio content comprises speech from the speaker includes determining that the one or more segments of the media file comprise speech from the speaker in response to the identifying the one or more segments of the media file at which both lip movement and voice activity are detected.

9. The method of claim 1, providing the metadata to a playback system that causes the playback system to, during playback of the media file, signal the temporal correlation between the speech and the lip movement of the speaker.

10. A speech detection system comprising: at least one physical processor; physical memory comprising computer-executable instructions that, when executed by the physical processor, cause the physical processor to: analyze a media file to detect lip movement of a speaker who is visually rendered in media content of the media file; identify audio content within the media file; and improve accuracy of a temporal correlation of the speech detection system by: correlating the lip movement of the speaker with the audio content; determining, based on the correlation between the lip movement of the speaker and the audio content, that the audio content comprises speech from the speaker; and recording, based on the determination that the audio content comprises speech from the speaker, the temporal correlation between the speech and the lip movement of the speaker as metadata of the media file.

11. The system of claim 10, wherein: the instructions that cause the physical processor to identify the audio content include instructions that cause the physical processor to calculate energy values of the audio content of one or more segments; the instructions that cause the physical processor to correlate the lip movement of the speaker with the audio content include instructions that cause the physical processor to determine a cross-correlation between the lip movement and energy values for a segment by measuring similarity of a summed sequence of the ratio values of the segment as a function of displacement of that summed sequence with respect to another summed sequence of the energy values for the segment; and wherein the instructions that cause the physical processor to determine that the audio content comprises speech from the speaker include instructions that cause the physical processor to determine one or more segments of the media file at which the cross-correlation exceeds a threshold.

12. The system of claim 11, wherein the instructions that cause the physical processor to analyze the media file to detect lip movement of the speaker include instructions that cause the physical processor to: identify one or more segments of the media file in which lips of the speaker are open based on the ratio values that reflect a ratio of mouth height to mouth width; determine a standard variance of the one or more segments by measuring an average spread of ratio values of a segment from a mean of the ratio values of the segment; and detect lip movement in the one or more segments for which the standard variance exceeds a threshold.

13. The system of claim 10, wherein the instructions that cause the physical processor to identify the audio content include instructions that cause the physical processor to perform voice activity detection (VAD) of the media file using a VAD algorithm that employs a classifier to make predictions of speech and non-speech for one or more individual audio frames.

14. The system of claim 13, wherein the instructions that cause the physical processor to determine that the audio content comprises speech from the speaker include instructions that cause the physical processor to determine that one or more segments of the media file comprise speech from the speaker in response to identifying the one or more segments of the media file at which both lip movement and voice activity are detected.

15. The system of claim 10, further comprising instructions that cause the physical processor to provide the metadata to a playback system that causes the playback system to, during playback of the media file, signal the temporal correlation between the speech and the lip movement of the speaker.

16. A non-transitory computer-readable medium comprising one or more computer-executable instructions that, when executed by at least one processor of a computing device, cause the computing device to: analyze, by a speech detection system, a media file to detect lip movement of a speaker who is visually rendered in media content of the media file; identify, by the speech detection system, audio content within the media file; and improve accuracy of a temporal correlation of the speech detection system by: correlating the lip movement of the speaker with the audio content; determining, based on the correlation between the lip movement of the speaker and the audio content, that the audio content comprises speech from the speaker; and recording, based on the determination that the audio content comprises speech from the speaker, the temporal correlation between the speech and the lip movement of the speaker as metadata of the media file.

17. The non-transitory computer-readable medium of claim 16, wherein: the instructions that cause the computing device to identify the audio content include instructions that cause the computing device to calculate energy values of the audio content of one or more segments; the instructions that cause the computing device to correlate the lip movement of the speaker with the audio content include instructions that cause the computing device to determine a cross-correlation between the lip movement and energy values for a segment by measuring similarity of a summed sequence of the ratio values of the segment as a function of displacement of that summed sequence with respect to another summed sequence of the energy values for the segment.

18. The non-transitory computer-readable medium of claim 16, wherein: the instructions that cause the computing device to identify the audio content include the instructions that cause the computing device to perform voice activity detection (VAD) of the media file using a VAD algorithm that employs a classifier to make predictions of speech and non-speech for one or more individual audio frames; and wherein the instructions that cause the computing device to determine that the audio content comprises speech from the speaker include instructions that cause the computing device to determine that one or more segments of the media file comprise speech from the speaker in response to the identifying the one or more segments of the media file at which both lip movement and voice activity are detected.

19. The non-transitory computer-readable medium of claim 16, further comprising instructions that cause the computing device to provide the metadata to a playback system that causes the playback system to, during playback of the media file, signal the temporal correlation between the speech and the lip movement of the speaker.

20. The non-transitory computer-readable medium of claim 19, wherein the indicators correspond to at least one of visual indicators or auditory indicators.

Content that is created or modified using the methods described herein may be used and/or distributed in a variety of ways and/or by a variety of systems. Such systems may include content distribution ecosystems, as shown in FIGS. 14-16.

Figure 14:
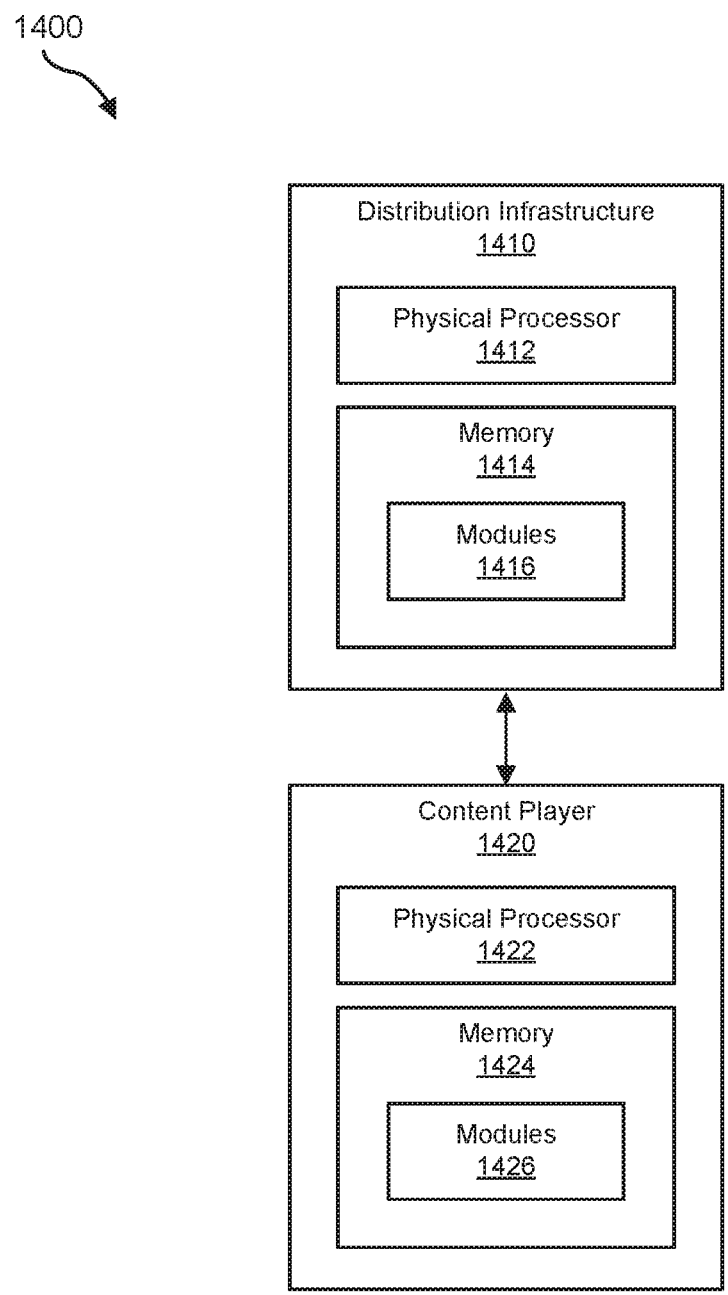
FIG. 14 is a block diagram of an exemplary content distribution ecosystem.

FIG. 14 is a block diagram of a content distribution ecosystem 1400 that includes a distribution infrastructure 1410 in communication with a content player 1420. In some embodiments, distribution infrastructure 1410 is configured to encode data and to transfer the encoded data to content player 1420 via data packets. Content player 1420 is configured to receive the encoded data via distribution infrastructure 1410 and to decode the data for playback to a user. The data provided by distribution infrastructure 1410 may include audio, video, text, images, animations, interactive content, haptic data, virtual or augmented reality data, location data, gaming data, or any other type of data that may be provided via streaming.

Distribution infrastructure 1410 generally represents any services, hardware, software, or other infrastructure components configured to deliver content to end users. In some examples, distribution infrastructure 1410 includes content aggregation systems, media transcoding and packaging services, network components (e.g., network adapters), and/or a variety of other types of hardware and software. Distribution infrastructure 1410 may be implemented as a highly complex distribution system, a single media server or device, or anything in between. In some examples, regardless of size or complexity, distribution infrastructure 1410 includes at least one physical processor 1412 and at least one memory device 1414. One or more modules 1416 may be stored or loaded into memory 1414 to enable adaptive streaming, as discussed herein.

Content player 1420 generally represents any type or form of device or system capable of playing audio and/or video content that has been provided over distribution infrastructure 1410. Examples of content player 1420 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1410, content player 1420 includes a physical processor 1422, memory 1424, and one or more modules 1426. Some or all of the adaptive streaming processes described herein may be performed or enabled by modules 1426, and in some examples, modules 1416 of distribution infrastructure 1410 may coordinate with modules 1426 of content player 1420 to provide adaptive streaming of multimedia content.

In certain embodiments, one or more of modules 1416 and/or 1426 in FIG. 14 may represent one or more software applications or programs that, when executed by a computing device, may cause the computing device to perform one or more tasks. For example, and as will be described in greater detail below, one or more of modules 1416 and 1426 may represent modules stored and configured to run on one or more general-purpose computing devices. One or more of modules 1416 and 1426 in FIG. 14 may also represent all or portions of one or more special-purpose computers configured to perform one or more tasks.

Physical processors 1412 and 1422 generally represent any type or form of hardware-implemented processing unit capable of interpreting and/or executing computer-readable instructions. In one example, physical processors 1412 and 1422 may access and/or modify one or more of modules 1416 and 1426, respectively. Additionally or alternatively, physical processors 1412 and 1422 may execute one or more of modules 1416 and 1426 to facilitate adaptive streaming of multimedia content. Examples of physical processors 1412 and 1422 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1414 and 1424 generally represent any type or form of volatile or non-volatile storage device or medium capable of storing data and/or computer-readable instructions. In one example, memory 1414 and/or 1424 may store, load, and/or maintain one or more of modules 1416 and 1426. Examples of memory 1414 and/or 1424 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 15:
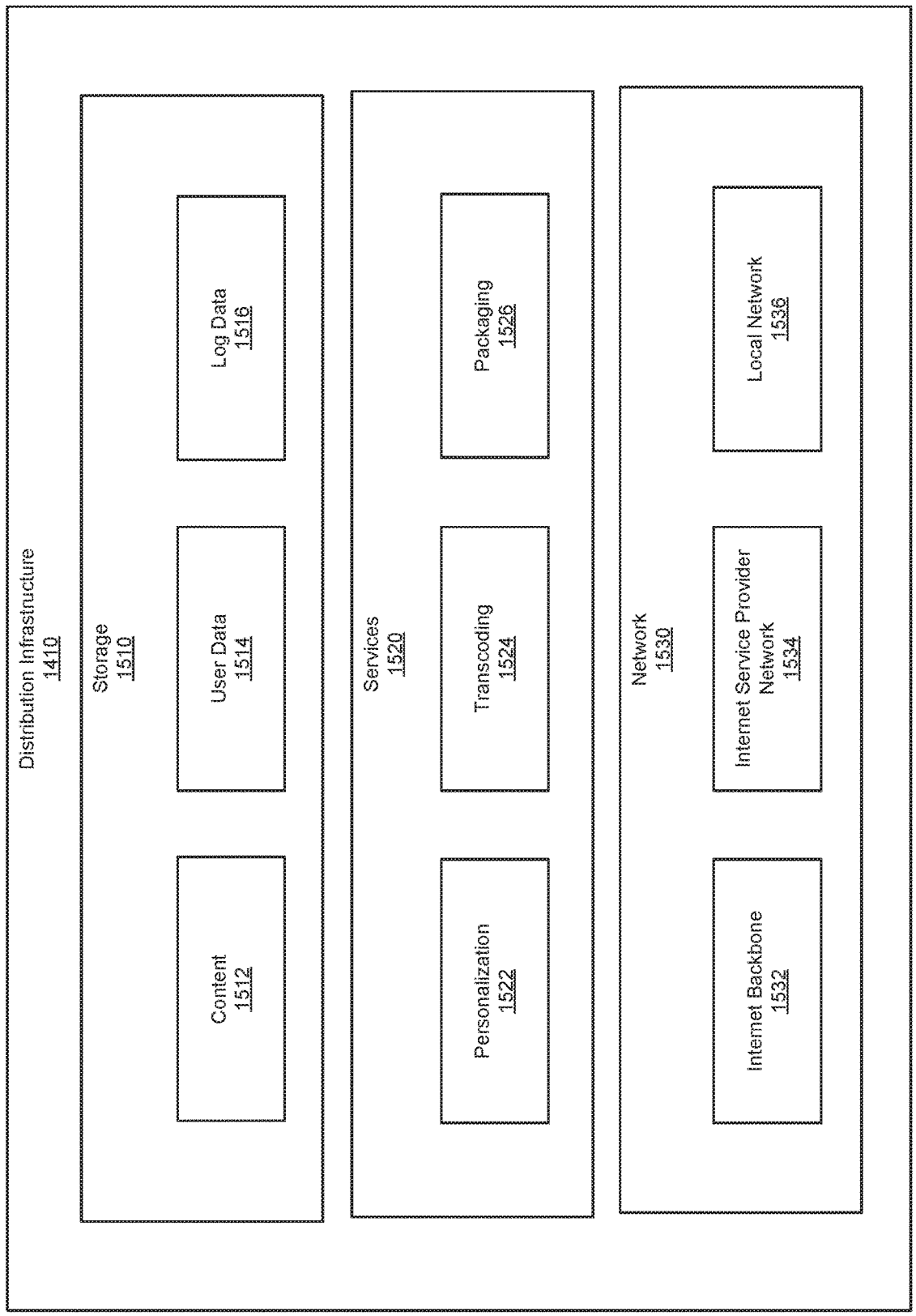
FIG. 15 is a block diagram of an exemplary distribution infrastructure within the content distribution ecosystem shown in FIG. 14.

FIG. 15 is a block diagram of exemplary components of content distribution infrastructure 1410 according to certain embodiments. Distribution infrastructure 1410 may include storage 1510, services 1520, and a network 1530. Storage 1510 generally represents any device, set of devices, and/or systems capable of storing content for delivery to end users. Storage 1510 may include a central repository with devices capable of storing terabytes or petabytes of data and/or may include distributed storage systems (e.g., appliances that mirror or cache content at Internet interconnect locations to provide faster access to the mirrored content within certain regions). Storage 1510 may also be configured in any other suitable manner.

As shown, storage 1510 may store, among other items, content 1512, user data 1514, and/or log data 1516. Content 1512 may include television shows, movies, video games, user-generated content, and/or any other suitable type or form of content. User data 1514 may include personally identifiable information (PII), payment information, preference settings, language and accessibility settings, and/or any other information associated with a particular user or content player. Log data 1516 may include viewing history information, network throughput information, and/or any other metrics associated with a user's connection to or interactions with distribution infrastructure 1410.

Services 1520 may include personalization services 1522, transcoding services 1524, and/or packaging services 1526. Personalization services 1522 may personalize recommendations, content streams, and/or other aspects of a user's experience with distribution infrastructure 1410. Encoding services 1524 may compress media at different bitrates which may enable real-time switching between different encodings. Packaging services 1526 may package encoded video before deploying it to a delivery network, such as network 1530, for streaming.

Network 1530 generally represents any medium or architecture capable of facilitating communication or data transfer. Network 1530 may facilitate communication or data transfer via transport protocols using wireless and/or wired connections. Examples of network 1530 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 15, network 1530 may include an Internet backbone 1532, an internet service provider 1534, and/or a local network 1536.

Figure 16:
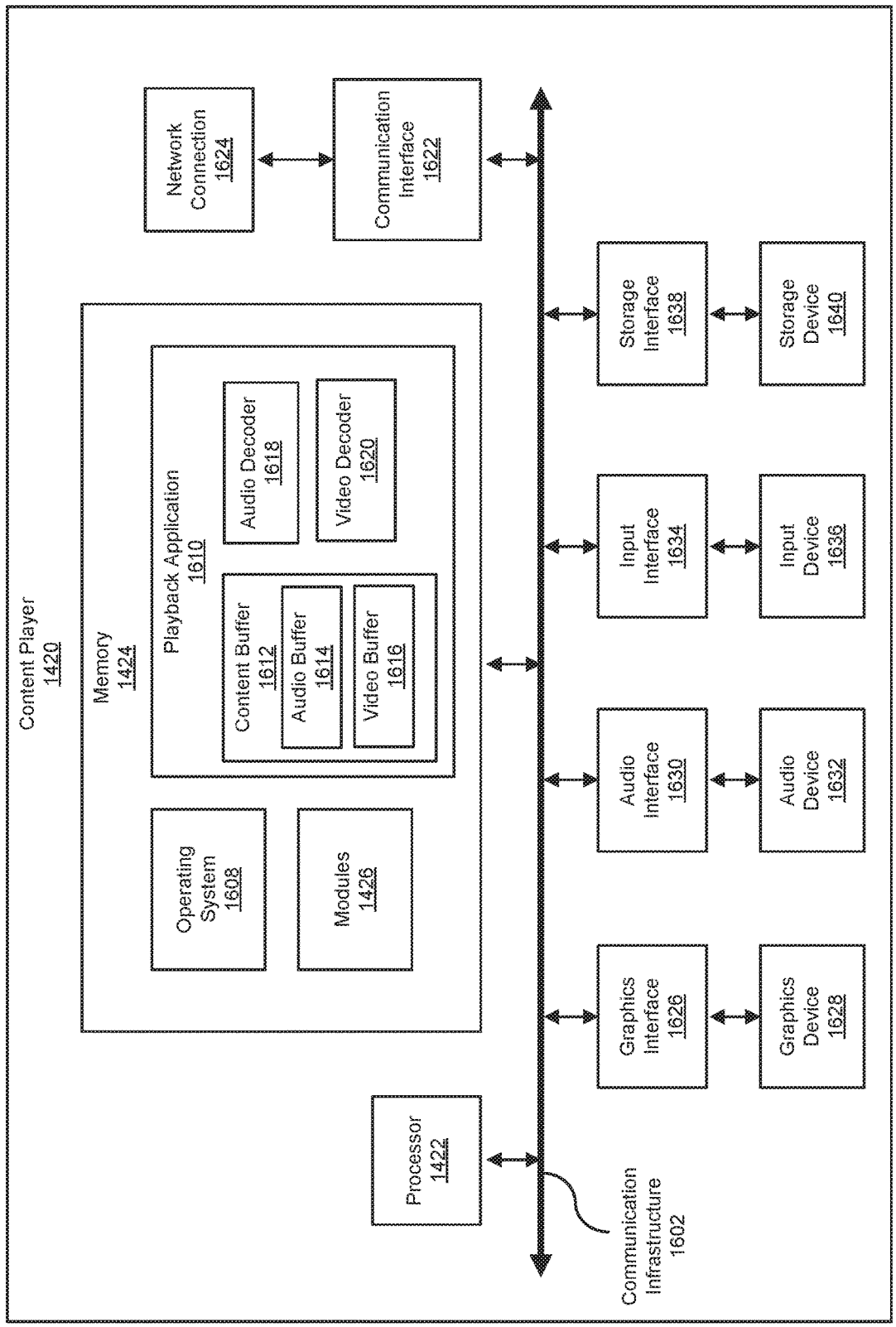
FIG. 16 is a block diagram of an exemplary content player within the content distribution ecosystem shown in FIG. 14.

FIG. 16 is a block diagram of an exemplary implementation of content player 1420 of FIG. 3. Content player 1420 generally represents any type or form of computing device capable of reading computer-executable instructions. Content player 1420 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 16, in addition to processor 1422 and memory 1424, content player 1420 may include a communication infrastructure 1602 and a communication interface 1622 coupled to a network connection 1624. Content player 1420 may also include a graphics interface 1626 coupled to a graphics device 1628, an input interface 1634 coupled to an input device 1636, an audio device 1632 connected to audio interface 1636, and a storage interface 1638 coupled to a storage device 1640.

Communication infrastructure 1602 generally represents any type or form of infrastructure capable of facilitating communication between one or more components of a computing device. Examples of communication infrastructure 1602 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1424 generally represents any type or form of volatile or non-volatile storage device or medium capable of storing data and/or other computer-readable instructions. In some examples, memory 1424 may store and/or load an operating system 1608 for execution by processor 1422. In one example, operating system 1608 may include and/or represent software that manages computer hardware and software resources and/or provides common services to computer programs and/or applications on content player 1420.

Operating system 1608 may perform various system management functions, such as managing hardware components (e.g., graphics interface 1626, audio interface 1630, input interface 1634, and/or storage interface 1638). Operating system 1608 may also process memory management models for playback application 1610. The modules of playback application 1610 may include, for example, a content buffer 1612, an audio decoder 1618, and a video decoder 1620. Content buffer 1612 may include an audio buffer 1614 and a video buffer 1616.

Playback application 1610 may be configured to retrieve digital content via communication interface 1622 and play the digital content through graphics interface 1626. A video decoder 1620 may read units of video data from video buffer 1616 and may output the units of video data in a sequence of video frames corresponding in duration to the fixed span of playback time. Reading a unit of video data from video buffer 1616 may effectively de-queue the unit of video data from video buffer 1616. The sequence of video frames may then be rendered by graphics interface 1626 and transmitted to graphics device 1628 to be displayed to a user.

In situations where the bandwidth of distribution infrastructure 1410 is limited and/or variable, playback application 1610 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 1420 may also include a storage device 1640 coupled to communication infrastructure 1602 via a storage interface 1638. Storage device 1640 generally represent any type or form of storage device or medium capable of storing data and/or other computer-readable instructions. For example, storage device 1640 may be a magnetic disk drive, a solid-state drive, an optical disk drive, a flash drive, or the like. Storage interface 1638 generally represents any type or form of interface or device for transferring data between storage device 1640 and other components of content player 1420.

Many other devices or subsystems may be included in or connected to content player 1420. Conversely, one or more of the components and devices illustrated in FIG. 16 need not be present to practice the embodiments described and/or illustrated herein. The devices and subsystems referenced above may also be interconnected in different ways from that shown in FIG. 16. Content player 1420 may also employ any number of software, firmware, and/or hardware configurations.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an audio signal to be transformed, transform the audio signal, output a result of the transformation to train a machine-learning algorithm, use the result of the transformation to identify a probable corresponding viseme, and store the result of the transformation to metadata for the audio signal. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    training at least one machine learning model to identify auditory speech content within a media file, the machine learning model comprising a voice activity detection algorithm;
    using the trained voice activity detection VAD algorithm, identifying auditory speech content within the media file;
    detecting, solely among those segments of the media file that include auditory speech content, visible movement of a speaker's lips rendered in media content of the media file, wherein the visible movement is detected when variance for the segments of the media file that include auditory speech content is above a heuristic threshold;
    correlating the detected visible movement of the speaker's lips with the auditory speech content identified using the trained voice activity detection algorithm according to a cross-correlation metric, wherein the cross-correlation metric is weighted using the trained VAD algorithm, and wherein the heuristic threshold for those segments of the media file that include auditory speech is adjusted using the trained VAD algorithm;
    determining, based on the correlation between the visible movement of the speaker's lips and the identified auditory speech content, that a portion of the auditory speech content is visibly synchronized with the visible movement of the speaker's lips; and
    recording, based on the determination that the portion of the auditory speech content is visibly synchronized with the visible movement of the speaker's lips, an indicator of an importance of visual synchrony between a dubbing of the auditory speech content and the visible movement of the speaker's lips as metadata of the media file.

2. The method of claim 1, wherein detecting the visible movement of the speaker's lips includes:
    identifying one or more segments of the media file in which the lips of the speaker are open based on a ratio of mouth height to mouth width;
    determining a standard variance of the one or more segments by measuring an average spread of ratio values of a segment from a mean of ratio values of the segment; and
    detecting the visible movement in the one or more segments for which the standard variance exceeds a threshold.

3. The method of claim 2, wherein identifying the auditory speech content includes calculating energy values of the auditory speech content of the one or more segments.

4. The method of claim 3, wherein correlating the visible movement of the speaker's lips with the auditory speech content includes determining a cross-correlation between the visible movement and energy values for the segment by measuring similarity of a summed sequence of the ratio values of the segment as a function of displacement of that summed sequence with respect to another summed sequence of the energy values for the segment.

5. The method of claim 1, wherein identifying the auditory speech content includes performing voice activity detection (VAD) of the media file using a VAD algorithm that employs a classifier to make predictions of speech and non-speech for one or more individual audio frames.

6. The method of claim 5, wherein correlating the visible movement of the speaker's lips with the auditory speech content includes identifying one or more segments of the media file at which both visible movement and voice activity are detected.

7. The method of claim 1, further comprising providing the metadata to a playback system that causes the playback system to, during playback of the media file, signal the importance of visual synchrony between the dubbing of the auditory speech content and the visible movement of the speaker's lips.

8. The method of claim 1, wherein:
    the portion of the auditory speech content corresponds to a portion of an original dialogue; and
    the method further comprises presenting, to a translator, the indicator of the importance of visual synchrony along with the portion of the original dialogue while displaying the visible movement of the speaker's lips from the media content of the media file.

9. The method of claim 1, wherein:
    the portion of the auditory speech content corresponds to a portion of an original dialogue; and
    the method further comprises presenting, to a director of a voice actor, the indicator of the importance of visual synchrony along with a translation of the portion of the original dialogue while displaying the visible movement of the speaker's lips from the media content of the media file.

10. The method of claim 1, wherein:
    the portion of the auditory speech content corresponds to a portion of an original dialogue; and
    the method further comprises presenting, to a voice actor, the indicator of the importance of visual synchrony along with a translation of the portion of the original dialogue while displaying the visible movement of the speaker's lips from the media content of the media file.

11. A speech detection system comprising:
at least one physical processor;
physical memory comprising computer-executable instructions that, when executed by the physical processor, cause the physical processor to:
  train at least one machine learning model to identify auditory speech content within a media file, the machine learning model comprising a voice activity detection algorithm;
  using the trained voice activity detection algorithm, identify auditory speech content within the media file;
  detect, solely among those segments of the media file that include auditory speech content, visible movement of a speaker's lips rendered in media content of the media file, wherein the visible movement is detected when variance for the segments of the media file that include auditory speech content is above a heuristic threshold;
  correlate the detected visible movement of the speaker's lips with the auditory speech content identified using the trained voice activity detection algorithm according to a cross-correlation metric, wherein the cross-correlation metric is weighted using the trained VAD algorithm, and wherein the heuristic threshold for those segments of the media file that include auditory speech is adjusted using the trained VAD algorithm;
  determine, based on the correlation between the visible movement of the speaker's lips and the identified auditory speech content, that a portion of the auditory speech content is visibly synchronized with the visible movement of the speaker's lips; and
  record, based on the determination that the portion of the auditory speech content is visibly synchronized with the visible movement of the speaker's lips, an indicator of an importance of visual synchrony between a dubbing of the portion of the auditory speech content and the visible movement of the speaker's lips as metadata of the media file.

12. The system of claim 11, wherein:
the instructions that cause the physical processor to identify the auditory speech content include instructions that cause the physical processor to calculate energy values of the auditory speech content of one or more segments;
the instructions that cause the physical processor to correlate the visible movement of the speaker's lips with the auditory speech content include instructions that cause the physical processor to determine a cross-correlation between the visible movement and energy values for a segment by measuring similarity of a summed sequence of ratio values of the segment as a function of displacement of that summed sequence with respect to another summed sequence of the energy values for the segment; and
wherein the instructions that cause the physical processor to determine that a portion of the auditory speech content is visibly synchronized with the visible movement of the speaker's lips include instructions that cause the physical processor to determine one or more segments of the media file at which the cross-correlation exceeds a threshold.

13. The system of claim 12, wherein the instructions that cause the physical processor to detect the visible movement of the speaker's lips include instructions that cause the physical processor to:
  identify one or more segments of the media file in which the lips of the speaker are open based on the ratio values that reflect a ratio of mouth height to mouth width;
  determine a standard variance of the one or more segments by measuring an average spread of ratio values of a segment from a mean of the ratio values of the segment; and
  detect the visible movement in the one or more segments for which the standard variance exceeds a threshold.

14. The system of claim 11, wherein the instructions that cause the physical processor to identify the auditory speech content include instructions that cause the physical processor to perform voice activity detection (VAD) of the media file using a VAD algorithm that employs a classifier to make predictions of speech and non-speech for one or more individual audio frames.

15. The system of claim 11, further comprising instructions that cause the physical processor to provide the metadata to a playback system that causes the playback system to, during playback of the media file, signal the importance of visual synchrony between the dubbing of the auditory speech content and the visible movement of the speaker's lips.

16. A non-transitory computer-readable medium comprising one or more computer-executable instructions that, when executed by at least one processor of a computing device, cause the computing device to:
  train at least one machine learning model to identify auditory speech content within a media file, the machine learning model comprising a voice activity detection algorithm;
  using the trained voice activity detection VAD algorithm, identify auditory speech content within the media file;
  detect, solely among those segments of the media file that include auditory speech content, visible movement of a speaker's lips rendered in media content of the media file, wherein the visible movement is detected when variance for the segments of the media file that include auditory speech content is above a heuristic threshold;
  correlate the detected visible movement of the speaker's lips with the auditory speech content identified using the trained voice activity detection algorithm according to a cross-correlation metric, wherein the cross-correlation metric is weighted using the trained VAD algorithm, and wherein the heuristic threshold for those segments of the media file that include auditory speech is adjusted using the trained VAD algorithm;
  determine, based on the correlation between the visible movement of the speaker's lips and the identified auditory speech content, that a portion of the auditory speech content is visibly synchronized with the visible movement of the speaker's lips; and
  record, based on the determination that the portion of the auditory speech content is visibly synchronized with the visible movement of the speaker's lips, an indicator of an importance of visual synchrony between a dubbing of the portion of the auditory speech content and the visible movement of the speaker's lips as metadata of the media file.

17. The non-transitory computer-readable medium of claim 16, wherein:
the instructions that cause the computing device to identify the auditory speech content include instructions that cause the computing device to calculate energy values of the auditory speech content of one or more segments; and the instructions that cause the computing device to correlate the visible movement of the speaker's lips with the auditory speech content include instructions that cause the computing device to determine a cross-correlation between the visible movement and energy values for a segment by measuring similarity of a summed sequence of ratio values of the segment as a function of displacement of that summed sequence with respect to another summed sequence of the energy values for the segment.

18. The non-transitory computer-readable medium of claim 16, wherein the instructions that cause the computing device to identify the auditory speech content include the instructions that cause the computing device to perform voice activity detection (VAD) of the media file using a VAD algorithm that employs a classifier to make predictions of speech and non-speech for one or more individual audio frames.

19. The non-transitory computer-readable medium of claim 16, further comprising instructions that cause the computing device to provide the metadata to a playback system that causes the playback system to, during playback of the media file, signal the importance of visual synchrony between the dubbing of the auditory speech content and the visible movement of the speaker's lips.

20. The non-transitory computer-readable medium of claim 19, wherein the signal corresponds to at least one of visual indicators or auditory indicators.

\* \* \* \* \*